US011170401B1

(12) United States Patent
Chitilian et al.

(10) Patent No.: US 11,170,401 B1
(45) Date of Patent: Nov. 9, 2021

(54) ADVERTISER CAMPAIGN SCRIPTING

(71) Applicant: Google LLC, Mountain View, CA (US)

(72) Inventors: Varouj A. Chitilian, Hillsborough, CA (US); Ilya Netchitailo, San Jose, CA (US); Nikhil Bakshi, Mountain View, CA (US); Jiaqi Yu, Hayward, CA (US); Chetan Patel, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/927,213

(22) Filed: Jul. 13, 2020

Related U.S. Application Data

(63) Continuation of application No. 16/588,131, filed on Sep. 30, 2019, now Pat. No. 10,748,176, which is a continuation of application No. 15/342,863, filed on Nov. 3, 2016, now Pat. No. 10,475,065, which is a continuation of application No. 13/476,135, filed on May 21, 2012, now Pat. No. 9,519,920.

(60) Provisional application No. 61/555,092, filed on Nov. 3, 2011, provisional application No. 61/555,086, filed on Nov. 3, 2011, provisional application No. 61/555,068, filed on Nov. 3, 2011, provisional application No. 61/555,071, filed on Nov. 3, 2011, provisional application No. 61/525,459, filed on Aug. 19, 2011.

(51) Int. Cl.
*G06Q 30/02* (2012.01)
*G06F 9/54* (2006.01)

(52) U.S. Cl.
CPC ......... *G06Q 30/0244* (2013.01); *G06F 9/542* (2013.01); *G06Q 30/0275* (2013.01); *G06Q 30/0277* (2013.01)

(58) Field of Classification Search
CPC .......... G06Q 30/0242; G06Q 30/0276; G06Q 30/0275; G06Q 30/0243; G06Q 30/0277; G06Q 30/0244
See application file for complete search history.

(56) References Cited

U.S. PATENT DOCUMENTS

| 7,006,979 | B1 * | 2/2006 | Samra ................ G06Q 20/085 |
| | | | 705/7.28 |
| 8,812,625 | B1 | 8/2014 | Chitilian et al. |
| 8,898,071 | B2 | 11/2014 | Poirier |
| 2005/0027594 | A1 | 2/2005 | Yasnovsky |
| 2005/0273773 | A1 | 12/2005 | Gold |
| 2007/0027756 | A1 | 2/2007 | Collins et al. |
| 2007/0027759 | A1 | 2/2007 | Collins |
| 2007/0027771 | A1 | 2/2007 | Collins |
| 2007/0162379 | A1 * | 7/2007 | Skinner ................ G06Q 40/04 |
| | | | 705/37 |
| 2007/0239519 | A1 | 10/2007 | Walker |
| 2008/0219638 | A1 | 9/2008 | Haot et al. |
| 2008/0255922 | A1 | 10/2008 | Feldman |
| 2008/0270164 | A1 * | 10/2008 | Kidder ............... G06Q 30/0241 |
| | | | 705/14.4 |

(Continued)

OTHER PUBLICATIONS

U.S. Appl. No. 12/764,501, filed Apr. 21, 2010, Chitilian et al.

(Continued)

*Primary Examiner* — Brian W Wathen
(74) *Attorney, Agent, or Firm* — Fish & Richardson P.C.

(57) ABSTRACT

Methods, systems, and apparatus, including computer programs encoded on a computer storage medium, for automated management of campaigns using scripted rules.

20 Claims, 22 Drawing Sheets

(56) References Cited

U.S. PATENT DOCUMENTS

| | | | |
|---|---|---|---|
| 2009/0099902 A1 | 4/2009 | Chatter | |
| 2009/0132346 A1 | 5/2009 | Duggal | |
| 2009/0313120 A1 | 12/2009 | Ketchum | |
| 2009/0327083 A1 | 12/2009 | Mathew | |
| 2011/0035277 A1 | 2/2011 | Kodialam | |
| 2011/0040824 A1 | 2/2011 | Harm | |
| 2011/0071899 A1 | 3/2011 | Robertson | |
| 2011/0191182 A1* | 8/2011 | Poirier | G06Q 30/0256 705/14.54 |
| 2011/0196748 A1 | 8/2011 | Caron | |
| 2012/0036008 A1* | 2/2012 | Robertson | G06Q 30/02 705/14.43 |
| 2012/0036009 A1* | 2/2012 | Aronowich | G06Q 10/06315 705/14.43 |
| 2012/0078730 A1* | 3/2012 | Ramaiyer | G06Q 30/0275 705/14.71 |
| 2018/0012252 A1 | 1/2018 | Balasubramanian et al. | |

OTHER PUBLICATIONS

"Campaign Management" PCC Campaign Management (Pay Per Click) Paid Search [online]. [Retrieved on May 4, 2012], Retrieved from Internet electronic mail: http://www.marinsoftware.com/products/campaign-management, 1 page.

"Kenshoo and Criteo Partnership Results in Stronger Insights & Performance Across Search & Retargeting" Kenshoo [online]. [Retrieved on May 4, 2012], Retrieved from Internet electronic mail: http://www.kenshoo.com/imgs/Kenshoo_Retargeting_Case Study.pdf, 1 page.

"Kenshoo Editor 2.0" Kenshoo [online]. [Retrieved on May 4, 2012], Retrieved from Internet electronic mail: http://www.kenshoo.com/imgs/Kenshoo_Editor_Brochure.pdf, 1 page.

"Kenshoo Enterprise" Kenshoo [online]. Copyright 2012. [Retrieved on May 4, 2012], Retrieved from Internet electronic mail: http://www.kenshoo.com/Enterprise, 2 pages.

"Kenshoo Portfolio Optimizer" Kenshoo [online]. [Retrieved on May 4, 2012], Retrieved from Internet electronic mail: http://www.kenshoo.com/imgs/RealTime_Campaigns.pdf, 3 pages.

"Kenshoo Universal Platform" Kenshoo [online]. [Retrieved on May 4, 2012], Retrieved from Internet electronic mail: http://www.kenshoo.com/imgs/Kenshoo_Universal_Platform Brochure.pdf, 2 pages.

"Optimization Platform" Adobe, Efficient Frontier [online]. [Retrieved on May 14, 2012], Retrieved from the Internet electronic mail: http://www.efrontier.com/innovation/optimization-platform, 5 pages.

"RealTime CampaignsTM" Kenshoo [online]. [Retrieved on May 4, 2012], Retrieved from Internet electronic mail: http://www.kenshoo.com/imgs/Kenshoo_Editor_Brochure.pdf, 1 pages.

"Retargeting: Kenshoee + Criteo" Kenshoo [online]. [Retrieved on May 4, 2012], Retrieved from Internet electronic mail: http://www.kenshoo.com/imgs/Kenshoo_Retargeting_Brochure.pdf, 1 page.

"Solutions For Advertisers" Clickable [online] [Retrieved on May 4, 2012], Retrieved from Internet electronic mail: http://www.clickable.com/advertising-solutions/default.aspx, 2 pages.

"RealTime CampaignsTM" Kenshoo [online]. [Retrieved on May 4, 2012], Retrieved from Internet electronic mail: http://www.kenshoo.com/imgs/Kenshoo_Editor_Brochure.pdf, 1 page.

Davis, H., "Google Adertising Tools" (Jan. 2006), O'Reilly Media, Inc., pp. 141-189, 193-269, 273-337.

Reddy, M API Design for C++" (Feb. 18, 2011), Morgan Kufmann, 1st Edition, pp. 91-96, 151-160, 164-172, 253-255.

* cited by examiner

Create rule: Pause campaigns

Apply to: Current campaign ← 502

Automatic action: Pause campaign ← 504

Requirements: CTR < 1.00 % Remove
Impressions < 10,000 Remove ⎬ 506
+ Add requirement Frequency: Daily at 1:00pm using data from Yesterday ← 508

Name: Pause campaigns ← 510
Email results: After each run ← 512

514 → Preview rule  Previewing is required before saving or running

Cancel 516   518

Create rule: Raise bids to first page CPC  300

Apply to: All keywords in this ad group ← 302

Automatic action: Increase keyword bids to first page CPC ☑ Max. bid $ 10.00 ← 304

Requirements: CTR > 3.25 % Remove
% of daily budget exhausted < 90 % Remove ⎬ 306
+ Add requirement Frequency: Daily ← 308

Name: Raise bids to first page CPC ← 310
Email results: After each run ← 312

314 → Preview rule  ⟳ Running preview

Cancel 316   318

ADVERTISER CAMPAIGN SCRIPTING

This application is a continuation of, and claims priority to, U.S. patent application Ser. No. 16/588,131, titled "Advertiser Campaign Scripting," filed on Sep. 30, 2019, which is a continuation of, and claims priority to, U.S. patent application Ser. No. 15/342,863, now U.S. Pat. No. 10,475,065, titled "Advertiser Campaign Scripting," filed on Nov. 3, 2016, which application is a continuation of, and claims priority to, U.S. patent application Ser. No. 13/476,135, now U.S. Pat. No. 9,519,920, titled "Advertiser Campaign Scripting," filed on May 21, 2012, which application claims the benefit under 35 U.S.C. § 119(e) of U.S. Patent Application No. 61/525,459, entitled "Advertiser Campaign Scripting," filed Aug. 19, 2011; U.S. Patent Application No. 61/555,092, entitled "Advertiser Campaign Script Execution Management," filed Nov. 3, 2011; U.S. Patent Application No. 61/555,086, entitled "Advertiser Service Scripting," filed Nov. 3, 2011; U.S. Patent Application No. 61/555,068, entitled "Application Program Interface Script Caching And Batching," filed Nov. 3, 2011; and U.S. Patent Application No. 61/555,071, entitled "Advertising Campaign Script Execution Management," filed Nov. 3, 2011. The content of each of the foregoing applications is incorporated herein by reference in its entirety.

BACKGROUND

This specification relates to on-line advertising.

The Internet enables access to a wide variety of content items, e.g., video and/or audio files, web pages for particular subjects, news articles, etc. Such access to these content items likewise enables opportunities for targeted advertising. For example, advertisements can be provided with search results in response to a search query provided by a user; provided for web pages of third party online publishers that have content related to the advertisement; or provided in response to a specific request from a user, such as when a user requests information for particular products or services.

An advertising management system can be used to facilitate the value exchange between advertisers and publishers. Advertisers provide advertisements, specify targeting criteria for ad campaigns, and offer bids for the opportunities to have their advertisements presented on publishers' webpages. Online advertisers use advertising management tools to manage their advertising campaigns. These management tools include an account interface that allows an advertiser to create and define various aspects of advertising campaigns and ad groups, such as keywords, targeting criteria, budgets, bids for ad placement, duration, different types of advertisements, and so on. After the advertiser has specified the campaign and ad group data and activated the advertising campaigns and/or ad groups, advertisements can be dynamically selected and served on publishers' webpages according to the various keywords and other targeting criteria specified by the advertiser.

Once an advertising campaign is launched, an advertiser uses the advertising management tools to monitor the performance of the advertising campaign. Depending on the performance of the advertising campaign, the advertiser may desire to change targeting, bids, budgets, advertisements, etc., of the advertising campaign. However, the advertising campaign may have hundreds of bids, time sensitive budgets, and thousands of targeting criteria. Furthermore, the changing of any one of these parameters may be dependent on various conditions. Thus, the monitoring of an advertising campaign and changing of multiple parameters at various times during the life of the advertising campaign can be a labor-intensive task.

SUMMARY

In general, one innovative aspect of the subject matter described in this specification can be embodied in methods that include the actions of accessing advertising campaign data including a plurality of campaign management entities including an advertising campaign entity that defines an advertising campaign, a plurality of advertisement group entities, each advertisement group entity defining an advertisement group and specifying respective advertisement entities, a budget entity, targeting entities, and bid entities, wherein each respective advertisement entity defines an advertisement, the budget entity defines a budget, each targeting entity defines a targeting criterion, and each bid entity defines a bid, and each are associated with the advertisement group entity, and a plurality of rules, each rule associated with at least one of the advertising campaign entities and a user identifier, each rule defining an operation and a corresponding event, the event being the occurrence of a condition defined for the advertising campaign entity, and the operation being executed in response to the detection of the corresponding event and specifying an entity change for a campaign management entity associated with the advertising campaign entity, and wherein the user identifier is an identifier of user that defined the rule; detecting events defined by the rules associated with the advertising campaigns, and for each detected event: executing the operation associated with the event by the rule, and in response to the execution, changing the campaign management entity according to the specified entity change and attribute the change to the user identifier. Other embodiments of this aspect include corresponding systems, apparatus, and computer programs, configured to perform the actions of the methods, encoded on computer storage devices.

In general, another innovative aspect of the subject matter described in this specification can be embodied in systems that include a data processing apparatus including one or more computers; a data store storing advertising campaign data used by an advertising service, the advertising campaign data including a plurality of campaign management entities including an advertising campaign entity that defines an advertising campaign, a plurality of advertisement group entities, each advertisement group entity defining an advertisement group and specifying respective advertisement entities, a budget entity, targeting entities, and bid entities, wherein each respective advertisement entity defines an advertisement, the budget entity defines a budget, each targeting entity defines a targeting criterion, and each bid entity defines a bid, and each are associated with the advertisement group entity; a computer storage system storing instructions that when executed by data processing apparatus cause the data processing apparatus to perform actions comprising: accessing a candidate rule associated with at least one of the advertising campaign entities, the candidate rule defining an operation and a corresponding event, the event being the occurrence of a condition defined for the advertising campaign, and the operation being executed in response to the detection of the corresponding event and specifying an entity change for a campaign management entity associated with the advertising campaign entity; determining whether the candidate rule has been executed in a preview context; in response to determining that that candidate rule has not been executed in a preview context, precluding acceptance of the candidate rule for use in an automated management of the advertising campaign; and only in response to determining that that candidate rule has been executed in a preview context, allowance acceptance of the candidate rule for use in an automated management of the advertising campaign. Other embodiments of this aspect include corresponding methods, apparatus, and computer programs, configured to perform the actions of the methods, encoded on computer storage devices.

In general, another innovative aspect of the subject matter described in this specification can be embodied in systems that include a data processing apparatus including one or more computers; a computer storage system storing instructions that when executed by data processing apparatus cause the data processing apparatus to perform actions comprising: accessing advertising campaign data used by an advertising service, the advertising campaign data including: a plurality of campaign management entities including an advertising campaign entity that defines an advertising campaign, a plurality of advertisement group entities, each advertisement group entity defining an advertisement group and specifying respective advertisement entities, a budget entity, targeting entities, and bid entities, wherein each respective advertisement entity defines an advertisement, the budget entity defines a budget, each targeting entity defines a targeting criterion, and each bid entity defines a bid, and each are associated with the advertisement group entity; a plurality of rules, each rule associated with at least one of the advertising campaign entities, each rule defining an operation and a corresponding event, and the operation being executed in response to the detection of the corresponding event; monitor the advertising service and each of a plurality of application services that are external to the advertising service for events defined by the rules, each of the application services providing a respective application to users and hosted in a network external to client devices of the users; and in response monitoring an event defined by a rule, executing the operation defined by the rule. Other embodiments of this aspect include corresponding methods, apparatus, and computer programs, configured to perform the actions of the methods, encoded on computer storage devices.

In general, another innovative aspect of the subject matter described in this specification can be embodied in systems that include a data processing apparatus including one or more computers; a computer storage system storing instructions that when executed by data processing apparatus cause the data processing apparatus to perform actions comprising: accessing advertising campaign data including: a plurality of campaign management entities including an advertising campaign entity that defines an advertising campaign, a plurality of advertisement group entities, each advertisement group entity defining an advertisement group and specifying respective advertisement entities, a budget entity, targeting entities, and bid entities, wherein each respective advertisement entity defines an advertisement, the budget entity defines a budget, each targeting entity defines a targeting criterion, and each bid entity defines a bid, and each are associated with the advertisement group entity, and a rule associated with the advertising campaign entity and defining and defining an operation and an event, the event being the occurrence of a condition defined for the advertising campaign, and the operation being executed in response to the detection of the event and specifying an entity change for a plurality of campaign management entity associated with the advertising campaign entity; detecting the event defined by the rule associated with the advertising campaign, and for each detected event: determining whether a value of a processing metric for the rule exceeds a maximum threshold; in response to determining that the value does not exceed the maximum threshold, executing the operation associated with the event by the rule and in response to the execution change the campaign management entities according to the specified campaign entity change; and in response to determining that the value exceeds the maximum threshold: partitioning the plurality of campaign management entities into a plurality of subsets, each subset being a subset for which a respective value of the processing metric for the rule does not exceed the maximum threshold when the operation is executed on only the subset; and instantiating, for each subset, a separate execution fragment in which the operation is executed on only the subset to change the campaign management entities that belong to the subset according to the specified campaign entity change. Other embodiments of this aspect include corresponding methods, apparatus, and computer programs, configured to perform the actions of the methods, encoded on computer storage devices.

In general, another innovative aspect of the subject matter described in this specification can be embodied in systems that include the actions of a data processing apparatus including one or more computers; a data store storing advertising campaign data used by an advertising service, the advertising campaign data conforming to a flat Application Programming Interface (API), and including a plurality of campaign management entities including an advertising campaign entity that defines an advertising campaign, a plurality of advertisement group entities, each advertisement group entity defining an advertisement group and specifying respective advertisement entities, a budget entity, targeting entities, and bid entities, wherein each respective advertisement entity defines an advertisement, the budget entity defines a budget, each targeting entity defines a targeting criterion, and each bid entity defines a bid, and each are associated with the advertisement group entity; a computer storage system storing instructions that when executed by data processing apparatus cause the data processing apparatus to perform actions comprising: accessing a plurality of rules, each rule associated with at least one of the advertising campaign entities, each rule defining an operation and a corresponding event, the event being the occurrence of a condition defined for the advertising campaign, and the operation being executed in response to the detection of the corresponding event and specifying an entity change for a campaign management entity associated with the advertising campaign entity, and wherein the rules utilize a hierarchical data-model API to access the campaign management entities; converting, during execution of a rule, each hierarchical data-model API call for campaign entities specified in a rule to a flat API call for the campaign management entities; and accesses the advertising campaign data using the flat API calls. Other embodiments of this aspect include corresponding methods, apparatus, and computer programs, configured to perform the actions of the methods, encoded on computer storage devices.

In general, another innovative aspect of the subject matter described in this specification can be embodied in systems that includes a data processing apparatus including one or more computers; a computer storage system storing instructions that when executed by data processing apparatus cause the data processing apparatus to perform actions comprising: providing data defining a template user interface for defining a rule template that can be used to generate a rule that defines an operation and a corresponding event, the event being the occurrence of a condition defined for an advertising campaign identified by an advertising campaign entity, and the operation being executed in response to the detection of the corresponding event and specifying an entity change for a campaign management entity associated with the advertising campaign entity, the template user interface including: an entity selection menu from which a campaign management entity can be selected from a plurality of campaign management entities of advertising campaign data, the campaign management entities including an advertising campaign entity, an advertisement group entity, an advertisement entity, and a targeting entity; a variable declaration menu from which a variable type from a plurality of variable types can be selected; a script editing environment in which a script can be edited by a user, the script defining the operation and which operates on corresponding campaign entities that correspond to the variables; wherein: in response to receiving a selection of a variable type, a variable declaration is generated in the script editing environment; and in response to receiving a selection of an campaign entity, the operation is associated with the selected campaign entity so that the entity change affects the corresponding campaign entities to which the variable correspond and which are associated with the selected campaign entity. Other embodiments of this aspect include corresponding methods, apparatus, and computer programs, configured to perform the actions of the methods, encoded on computer storage devices.

In general, another innovative aspect of the subject matter described in this specification can be embodied in methods that include the actions of generating a user interface for an application in the display device, the user interface including first and second user interface environment selectors for the application, wherein each of the first and second user interface environment selector corresponds to respective first and second user interface environments that provide editing tools for first and second data types that respectively correspond to the first and second user interface environments; in response to receiving a selection of the first interface environment selector: generating the first user interface environment in the user interface; displaying, in the first user interface environment, a first menu that, in response to a selection, displays a first selection options that corresponds to a first operation on the first data type and a second selection option that corresponds to a second operation on the second data type; in response to receiving a selection of first selection option, displaying an operation user interface for the first operation with the first user interface environment; and in response to receiving a selection of the second selection option, transitioning in the user interface from the first user interface environment to the second user interface environment and displaying an operation user interface for the second operation with the second user interface environment. Other embodiments of this aspect include corresponding systems, apparatus, and computer programs, configured to perform the actions of the methods, encoded on computer storage devices.

In general, another innovative aspect of the subject matter described in this specification can be embodied in systems that include a data processing apparatus including one or more computers; a computer storage system storing instructions that when executed by data processing apparatus cause the data processing apparatus to perform actions comprising: accessing advertising campaign data including: a plurality of campaign management entities including an advertising campaign entity that defines an advertising campaign, a plurality of advertisement group entities, each advertisement group entity defining an advertisement group and specifying respective advertisement entities, a budget entity, targeting entities, and bid entities, wherein each respective advertisement entity to defines an advertisement, the budget entity defines a budget, each targeting entity defines a targeting criterion, and each bid entity defines a bid, and each are associated with the advertisement group entity; a rule associated with the advertising campaign entity and defining and defining an operation and a first event, the first event being the occurrence of a condition defined for the advertising campaign, and the operation being executed in response to the detection of the first event and specifying an entity change for a campaign management entity associated with the advertising campaign entity; detecting the first event defined by the rule associated with the advertising campaign and in response: executing the operation associated with the event by the rule, and in response to the execution, changing the campaign management entity according to the specified entity change; and for each campaign management entity changed by the operation, storing a first value for the campaign management entity in a change log, the first value being the value of the campaign management entity before being changed by the operation. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. The invocation of various rules based on detected events allows advertisers to automate the changing of many features of an advertising campaign. The automation of such changes allows advertisers to focus more time on the effects of the change and less time on manual processes to implement changes. This shift in focus, in turn, allows advertisers to devote more time to achieving the goals of their campaign, and this leads to better campaign management.

Rules can be triggered by events that are observed by an advertising service that is used to manage the advertising campaign, and by other application services that are external to the advertising service. This allows advertisers to manage their advertising campaigns from a variety of different application services, and have reports published in the format for different application services.

The execution of a rule can be partitioned into subsets that are executed in corresponding execution fragments that are executed in parallel. This can, for example, ensure that the rules are executed within a timeout constraint defined by an existing scripting system. This results in fewer data collisions and an increase in throughput. The batching into subsets is scalable, so that scripts for very large campaigns with hundreds of thousands of affected entities can be run within the timeout period.

The translation of calls scripted according to a hierarchical data model API into a flat data model API allows for entities to be handle in scripts in a way that matches a user's mental model of an advertising campaign. Such handling, in turn, provides users with a more intuitive framework for creating customized scripts.

A development user interface allows users to create customized scripts in an automated fashion based on selected parameters. Users have the ability to define templates, declare input output arguments, and events for each rule. Accordingly, users are not limited to predefined sets of scripting rules for an advertising campaign. Instead, users can generate multiple different types of rules for an advertising campaign, all within a user development interface framework that eliminates many script programming steps that would otherwise be required without the use of the development interface.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is an example user interface for keyword rules at an ad group level.

FIG. 4 is an example user interface for ad group rules at an ad group level.

FIG. 5 is an example user interface for campaign rules at an ad group level.

FIGS. 6A-6B are illustrations of user interfaces for previewing rules.

FIGS. 9A-9E are illustrations of user interfaces for developing customized rules for a campaign.

Like reference numbers and designations in the various drawings indicate like elements.

DETAILED DESCRIPTION

Example Environment

Figure 1A:
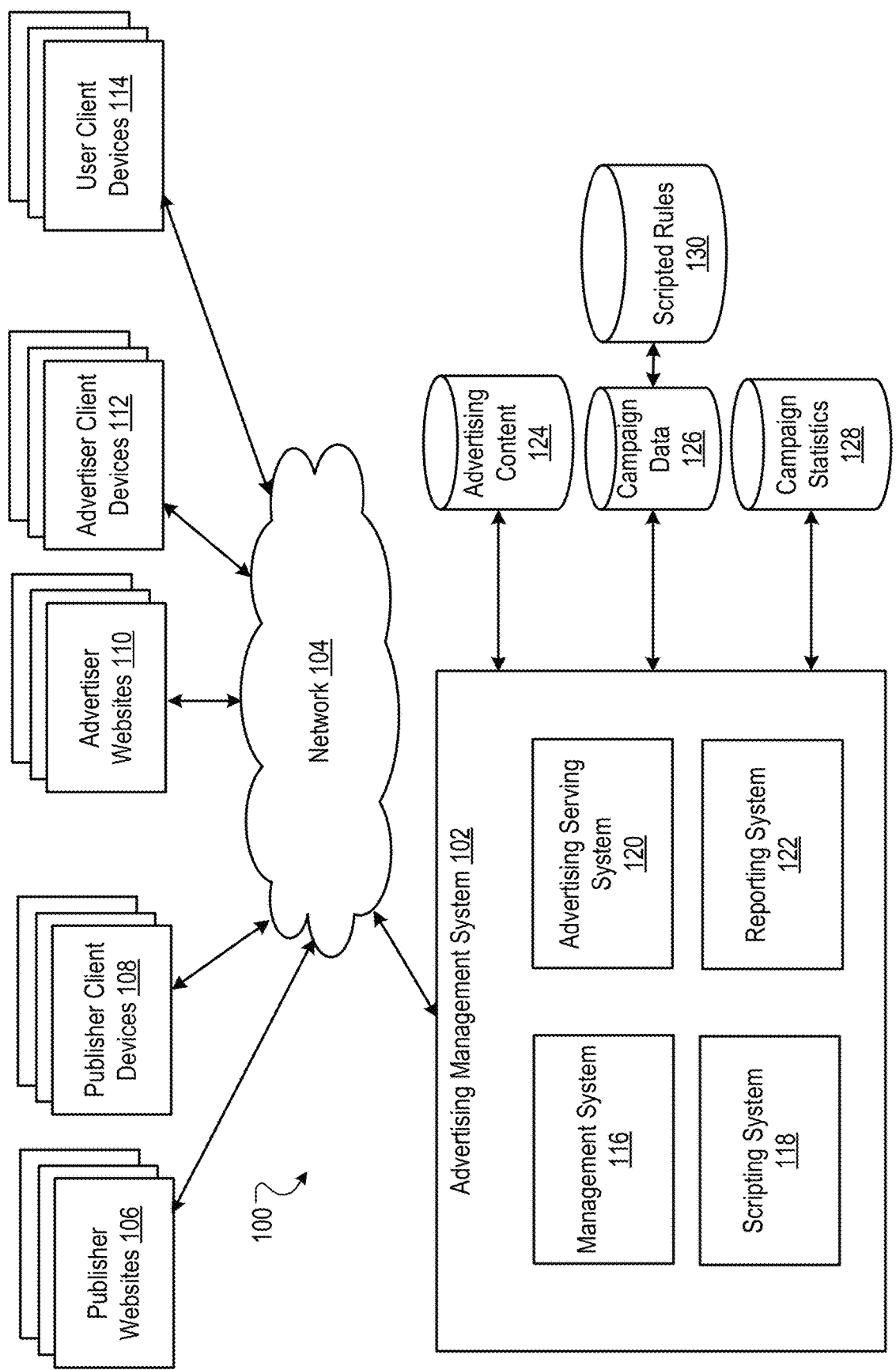
FIG. 1A is a block diagram of an example online advertising environment.

FIG. 1 is a block diagram of an example online advertising environment 100. The online advertising environment 100 utilizes an advertising management system 102 to facilitate the sale and purchase of online advertising opportunities between publishers and advertisers.

The online advertising environment 100 includes a computer network 104, such as a local area network (LAN), wide area network (WAN), the Internet, or a combination thereof, connecting publisher websites 106, publisher client devices 108, advertiser websites 110, advertiser client devices 112, user client devices 114, and the advertising management system 102. The advertising management system 102 further has access to an advertising content store 124, a campaign data store 126, and a campaign statistics store 128.

Each publisher website 106 has one or more webpage resources associated with a domain name, and each publisher website 106 is hosted by one or more servers. An example website is a collection of webpages formatted in hypertext markup language (HTML) that can contain text, images, multimedia content, and programming elements. Each publisher website 106 is maintained by a publisher, e.g., an entity that manages and/or owns the web site.

Publisher client devices 108, advertiser client devices 112, and user client devices 114 are electronic devices that are under the control of users. In particular, the publisher client devices 108 are under control of users that are agents of the publishers, the advertiser client devices 112 are under the control of users that are agents of the advertisers, and user client devices 114 are under the control of users that are not associated with the publishers or advertisers. A client device typically includes a user application, such as a web browser, to facilitate the sending and receiving of data over the network 104.

The advertising management system 102 facilitates the sale and purchase of advertising opportunities between publishers 106 and advertisers 110. The advertising management system 102 includes components such as a management system 116, a scripting system 118, an advertising serving system 120, and a reporting system 122.

The advertiser management system 116 provides user interfaces for advertisers (e.g., using advertiser client devices 112) to define advertising campaigns and ad groups, submit advertising content, and specify various targeting and/or ad placement criteria for the advertising content in each advertising campaign and/or ad group. The advertising content is stored in the advertising content store 124 and the targeting and ad placement criteria are stored in the campaign data store 126. For each ad group or campaign, the advertisers can also specify bids for ad slots associated with particular keywords through the interface provided by the advertiser management system 116. Advertisers' bids, budgets, as well as other campaign related preferences are also stored in the campaign data store 126.

An account management tool can be employed by an advertiser to create and manage a large number of online advertising campaigns for various products and services that the advertiser offers. The account management tool can be made available to the advertiser either through an online interface provided by the advertiser management system 116 or as a account management software application installed and executed locally at the advertiser's client devices 112. The online interface and/or the locally executed account management software application can be used for downloading existing account data from the advertiser management system 116 and for uploading new and/or modified account data to the advertiser management system 116.

The advertiser can create and manage multiple advertising campaigns using the account management tool offered by the advertiser management system 116. The advertiser can further specify multiple ad groups under each ad campaign, and specify respective advertisements, budgets, keywords, and other targeting and/or ad placement criteria for each of the ad groups. Typically, the advertising account can be abstracted into a hierarchical structure. For example, the advertising account can include one or more ad campaigns, each ad campaign can include one or more ad groups, and each ad group can include one or more advertisements and keywords.

Each advertising campaign is represented in the campaign data stores as a collection of associated campaign entities. Each particular advertising campaign is represented by an advertising campaign entity for the advertising campaign, and each advertising campaign entity can be associated with one or more advertisement group entities, each of which defines an advertisement group. Each advertising group entity, in turn, is associated with respective advertisement entities, a budget entity, targeting entities, and bid entities. Each respective advertisement entity defines an advertisement, the budget entity defines a budget, each targeting entity defines a targeting criterion, and each bid entity defines a bid. Other entity associations are also possible, e.g., an advertising campaign entity can be associated with a budget entity defining an overall budget, etc.

To create a new ad campaign, a user can first specify values for the campaign level advertising parameters of the ad campaign. The campaign level advertising parameters include, for example, a campaign name, a preferred content network for placing ads, a budget for the ad campaign, start and end dates for the ad campaign, a schedule for ad placements, a targeted language, and targeted geographical locations. Other campaign level advertising parameters includes, for example, a payment scheme such as a cost-per-click (CPC), cost per thousand impressions (CPM), cost-per-action (CPA), and so on.

For the ad campaign, the user can further define one or more ad groups. An ad group contains one or more advertisements, which target a particular set of keywords, ad placements, or both. Ad groups under the same campaign can share the same campaign level advertising parameters, but have tailored specifications for particular ad group level advertising parameters, such as keywords, bids for keywords, budget, and so on.

Generally, an advertiser can create different ad groups to have more focused targeting on different product lines or services. For example, different sets of keywords specific to the different product lines or services can be used for the different ad groups. Sometimes, different ad groups can also target different market segments and/or demographic characteristics. Keywords specific for the different market segments and/or demographic characteristics can be included in the different ad groups.

To create a new ad group, the user can first specify values for the ad group level advertising parameters of the ad group. The ad group level advertising parameters include, for example, an ad group name, and various bids for different ad placement opportunities (e.g., automatic placement, advertiser managed placement, etc.) or outcomes (e.g., clicks, impressions, conversions). An ad group name can be one or more terms that the user can use to concisely capture a topic or subject matter that the ad group is targeting. For example, a car dealership can create a different ad group for each type of vehicles it carries, and may further create a different ad group for each model of vehicles it carries. Examples of the ad group themes that the car dealership can use include, for example, "sports car," "sedan," "truck," "hybrid," and so on.

After creating the campaign and one or more ad groups under the campaign, the advertiser can specify one or more keywords and advertisements to each ad group. The keywords are typically terms that are relevant to the product or services that the user wishes to promote for the ad group. Each keyword can include one or more terms. For example, the car dealership may include "automobile", "sports car," "V-6 engine," "four-wheel drive," "fuel efficiency," and so on as keywords for its ad groups and ad campaigns. The advertiser can also specify whether exact match of keywords are required for ad placements on the content network.

In addition to keywords, for each ad group, the advertiser can also specify a number of advertisements for selection by the ad server when an advertising opportunity becomes available that matches the budget, ad schedule, maximum bids, keywords, and other targeting criteria specified for the ad group. Different types of ads can be included in an ad group, such as a text ad, an image ad, a local business ad, a mobile ad, and so on.

Other aspects of the ad group can be defined in terms of various advertising parameters and specified by user-entered values or default values for those various advertising parameters. After the advertiser has specified all the required advertising parameters for each level and aspect of the ad campaign(s), the advertising campaign entity data (e.g., including the campaign structure and the advertising parameters on each level within the campaign structure) can be uploaded to the advertiser management system 116, and the data are persisted to the campaign data store 126. The advertising campaign can be created and activated according to the advertising campaign data specified by the advertiser.

The management system 116 also provides an interface for publishers (e.g., using publisher client devices 108) to specify ad slots available on the publisher's online properties. For example, the publishers can specify the cost, type, dimensions, and targeting criteria (e.g., keywords associated with the content of the online properties) for each ad slot. The publisher management server 118 provides scripts or references to scripts to the publishers according to the specifications of the ad slots.

Each publisher 106 can insert instructions into its webpages or content items. When the webpages and content items are downloaded to user client devices 114, the instructions are executed to generate one or more ad requests to the advertising management system 102. The advertising serving system 120 of the advertising management system 102 responds to the ad requests by sending advertisements to the requesting user client device 114 for insertion into appropriate ad slots in the publisher's webpages or content items as rendered on the requesting user client device 114. The advertisements can include embedded links to landing pages (e.g., webpages on the advertisers' websites 110) that a user is directed to when the user clicks on the advertisements presented on the publisher's webpages or in the content items.

The ad requests are optionally associated with user characteristics (e.g., user's age, gender, income, language preferences, and so on) and advertising context (e.g., keywords associated with webpage content, location, local time of ad request, and so on).

Various user privacy measures are implemented to remove personally identifiable information from the user characteristics data. The advertising serving system 120 can select advertisements from the advertising content store 124 for each ad request based on a match between an advertiser's campaign criteria in the campaign data store 126 and the user characteristics and advertising context associated with the ad request.

The advertisements provided after a successful match, and optionally user responses (e.g., click-throughs, conversions, and so on) to the advertisements, can be tracked by various tracking mechanisms (e.g., tracking cookies, pixel callbacks, etc.), sent back to the advertising management system 102, and stored in the campaign statistics store 128. The tracking is enabled by various user opt-in processes. The reporting system 122 provides user interfaces for advertisers and publishers to review reports on the campaign statistics in various formats. Performance of particular keywords, ad groups, and campaigns can be measured based on various performance metrics, such as cost per action (e.g., click or conversion), conversion length (e.g., number of clicks between initial impression and conversion), and so on.

Scripting System

The advertising management system 102 also includes a scripting system 118 that facilitates advertising server scripting for automated management of an online advertising campaign. In some implementations, the scripting system 118 can be a part of the advertisement management system 116, and be realized by series of online user interfaces or a user interfaces generated from locally executed account management software.

Each advertiser, by means of user interface provided by the scripting system 118, can define scripted rules 130 and associate the rules with their advertising campaigns. The scripting system 118 facilitates the automation of actions that allow advertisers to associate campaign management operations with events that trigger the automations. The combination of one or more events and one or more operations is defined as a rule. The advertisement management system 102 monitors for the events, and upon the occurrence of events associated with a particular rule, the operations associated with that rule are executed.

In some implementations, the scripting system 118 pre-authorizes the operation of a rule based on the credentials of a particular user that is generating the rule. For example, if a particular advertising executive of an advertiser generates a rule by use of the scripting system 118, and the user is authorized to manually perform the operations defined by the rule, then the scripting system pre-authorizes the execution of the rule on behalf of the user. In addition, changes made to the campaign according to the specified changes of the rule are attributed to the user. Conversely, if the user is not authorized to manually perform the operations defined by the rule, then the scripting system does not pre-authorize the execution of the rule on behalf of the user.

Each rule is associated with an advertising campaign entity (e.g., directly associated with an advertising campaign entity or associated with a child entity of the advertising campaign entity) and defines an operation and a corresponding event. As used in this specification, an event is the occurrence of a condition defined for the advertising campaign(s) (or child entities of the advertising campaign) by the advertiser. The condition can be budget related, performance related, date related, targeting related, user device type related, etc., and combinations of one or more of these conditions. Events are described in more detail below.

The scripting system 118 executes the operation in response to the detection of the corresponding event. Each operation specifies an entity change for a campaign management entity associated with the advertising campaign entity and the rule.

Figure 1B:
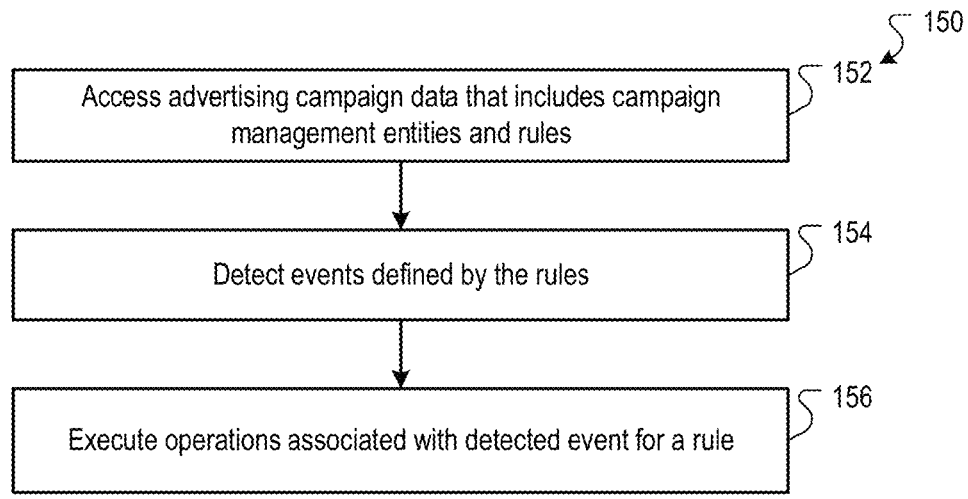
FIG. 1B is a flow diagram of an example process for executing rules associated with a campaign.

FIG. 1B is a flow diagram of an example process 150 for executing rules associated with a campaign. The process 150 can be implemented by the scripting system 118.

The scripting system 118 accesses advertising campaign data that includes campaign entities and rules (152). For example, the scripting system 118 accesses the campaign data store 126 of the advertising management system 102, and scripted rules 130 that are associated with the campaign data and defined by the advertisers.

The scripting system 118 detects events defined by the rules (154). For example, the scripting system 118, for each rule, determines the condition defined by the rule and checks to determine if the condition has occurred. If the condition has occurred, then the event is detected. An example of a condition is a click through rate associated with an ad group exceeding a threshold percentage defined by the advertiser. The conditions can be checked periodically, e.g., according to a frequency parameter associated with the rule. Conditions and frequencies are described in more detail below.

The scripting system 118 executes operations associated with the detected event for a rule (156). For example, scripting system 118 will change values associated with corresponding campaign entities affect by the operation and persist the changes to the campaign data store 126. An example of an operation is a changing of the cost per click bid associated with a particular ad group by a predefined percentage. Operations are described in more detail below.

In some implementations, each rule is also associated with the user identifier of the user that defined the rule. When the operations associated with the event by the rule are executed, the campaign management entity changes that occur are attributed to the user identifier. This allows the advertiser to track responsible parties that authorized the change to particular campaign entities, and, in some implementations, precludes the execution of the operation if authorization privileges associated with the user identifier have been revoked.

Example Scripting User Interfaces

Figure 2A:
FIG. 2A is an illustration of a user interface through which rules associated with an advertising campaign can be accessed.

The scripting system 118 provides a variety of user interfaces that facilitate the creation of rules for campaigns. FIG. 2A illustrates a user interface 200 through which rules associated with an advertising campaign can be accessed. As shown by the path 202 in FIG. 2A, campaign entities associated with a campaign identified by the advertising campaign entity "stamp classes" and an advertising group identified by the advertising group entity "cards" are displayed. The particular campaign entities that are shown are keyword targeting entities, as indicated by the selected tab of the tab list 204.

Various keywords and associated parameters are identified by data shown in the columns 206. For example, the keywords "stamping classes", "stampin up classes", etc., are associated with the ad group cards of the advertising campaign stamp classes. Thus, advertisements that are associated with this ad group are targeted using the keywords shown. The user may select specific keywords shown in the columns.

The user interface 200 includes an automate menu button 208 that can be used to access and manage rules associated with the advertising group "cards." In response to a selection of the automate menu button 208, the user interface 200 generates an automation menu 210. The menu includes multiple submenus 212, 214, 216, 218, and 222.

In some implementations, the submenus 212, 220, and 222 are static menus that are shown each time an automate menu button 208 is selected, and each additional submenu (e.g., submenus 214, 216, and 218) are contextual menus that are dependent on the particular campaign entity to which the user interface 200 corresponds. In FIG. 2A, for example, the user interface 200 presents keywords at an advertising group level. The contextual submenu 214 corresponds to keywords, and can be used to access an environment for creating rules for keywords. For example, as shown in FIG. 2A, rules with three different types of operations can be created—pausing keywords, changing a max cost per click (CPC) bid, and raising bids to a first page CPC. Likewise, the contextual submenu 216 corresponds to ad groups, and can be used to access an environment for creating rules for ad groups. Here, rules with two different types of operations can be created—pausing an ad group, and changing an ad group max CPC. Similarly, the contextual submenu 218 can be used to access environment for creating rules for campaigns. From the submenu 218, rules with two different types of operations can be created—pausing the campaign, and changing a daily budget.

The rule creation options shown in FIG. 2A are an example default set of rule creation options that available to all advertisers. As will be describe in more detail below, advertisers may also define customized operations for creating rules, and associate the customized rules with particular campaign entities. If such customized operations are defined, they are shown in the automation menu 210 if the user interface from which the automation menu is invoked is at a campaign level that corresponds to an associated customized operation.

Figure 2B:
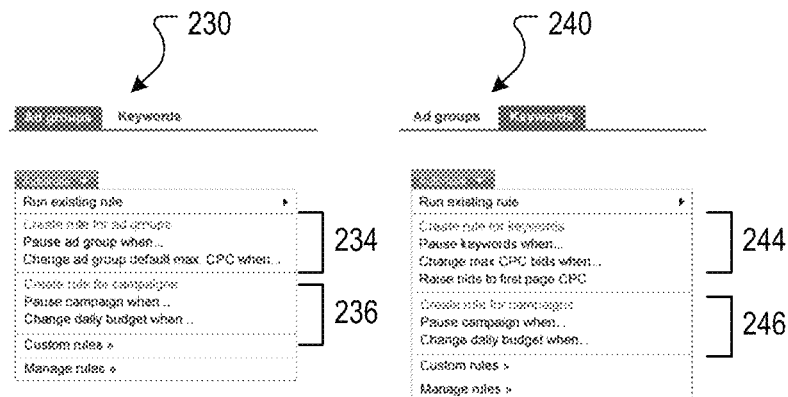
FIGS. 2B and 2C are illustrations of automation menus for different campaign entities at different campaign levels.
Figure 2C:
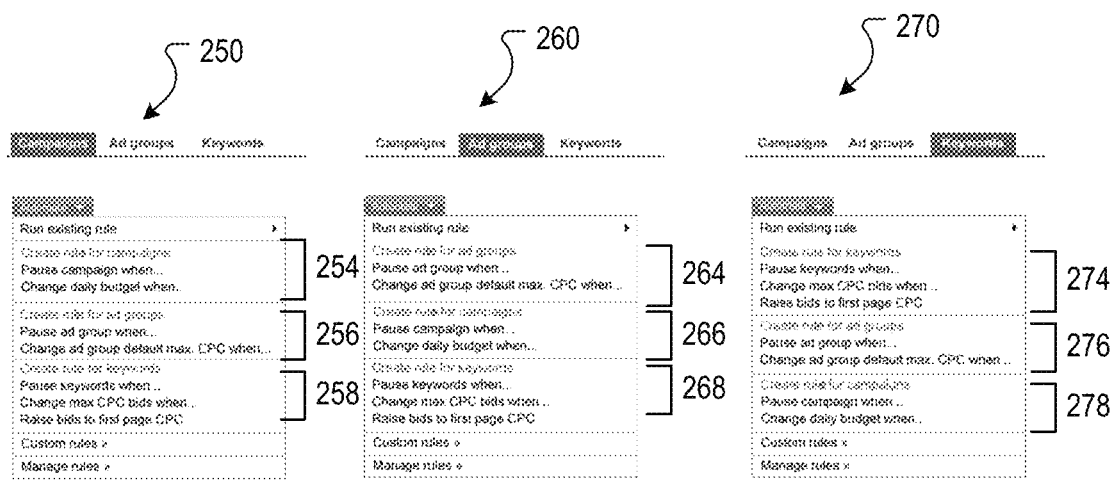

In general, an automation menu for a particular user interface corresponds to particular campaign level and campaign entities to which the user interface corresponds. FIGS. 2B and 2C are illustrations of automation menus for different campaign entities at different campaign levels. The automation menus 230 and 240 of FIG. 2B are automation menus that are generated at the campaign level for user interfaces that respectively present ad groups and keywords at the campaign level. The automation menu 230 includes contextual submenus 234 and 236. The contextual submenu 234 corresponds to advertising groups, and can be used to create rules for advertising groups. Likewise, the contextual submenu 236 corresponds to campaigns, and can be used to create rules for campaigns. The automation menu 240 is similar to the automation menu 230, including two contextual submenus 244 and 246. The contextual submenu 244 corresponds to keywords, and the contextual submenu 246 corresponds to campaigns.

The automation menus 250, 260, and 270 of FIG. 2C are automation menus that are generated for user interfaces that present all advertising campaigns associated with an advertiser. The automation menu 250 is generated in the user interface from which the user may select multiple campaigns, and includes contextual submenus 254, 256, and 258, that are respectively associated with campaigns, ad groups, and keywords. Likewise, the contextual submenu 260 is generated in a user interface in which a user may select multiple advertising groups from multiple campaigns, and includes contextual submenus 264, 266, and 268 that are respectively associated with advertising groups, campaigns, and keywords. The contextual submenu 270 is generated in a user interface in which a user may select multiple keywords for multiple campaigns, and includes contextual submenus 274, 276, and 278 that are respectively associated with keywords, advertising groups, and campaigns.

Figures 3, 4:
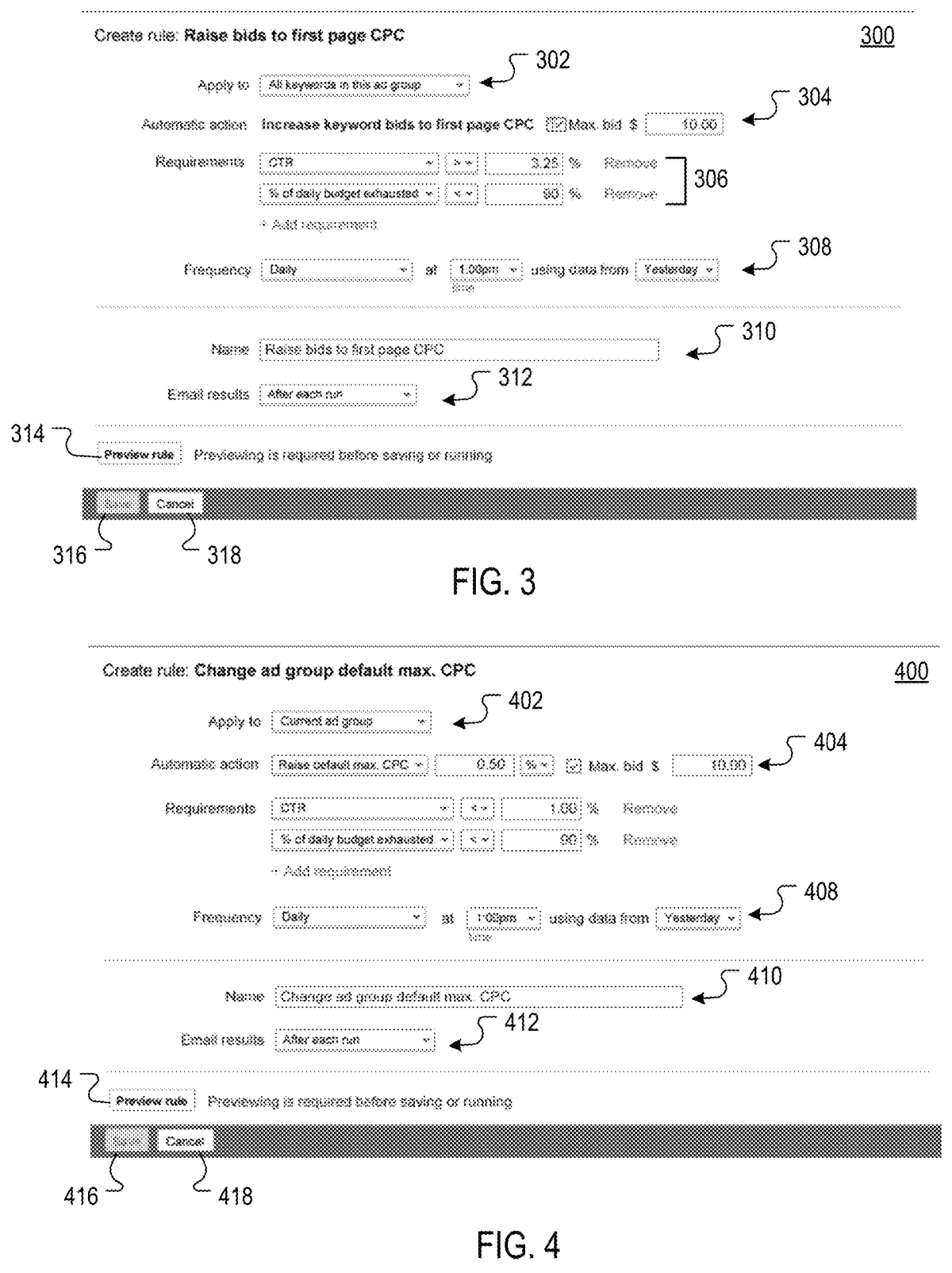

FIG. 3 is an example user interface 300 for keyword rules at an ad group level. The user interface 300, for example, can be accessed through an automation menu, or through another user interface element that can be used to invoke a rule creation environment. The user interface 300 is being used to create a rule titled "Raise bids to first page CPC."

An apply menu 302 is used to select campaign entities to which the rule will be associated. As shown in FIG. 3, the rule is currently selected to be applied to all keywords in a selected advertisement group. An alternative application selection could be, for example, a subset of keywords within an advertisement group.

The rule defines a corresponding operation 304 that, when executed, results in an increase in keyword bids for all keywords in the ad group, up to a maximum bid of $10, or some other value specified by the advertiser. For example, if the operation were to be executed, and a current first page cost per click for certain keywords is $4.50 and current keyword bids in the ad group are $3.25, then bid entities for the current keyword bids are increased to $4.50.

Also associated with the rule are conditions that define the event that will result in execution of the operation. The conditions are defined by requirements 306, each with different corresponding condition thresholds. The example condition shown are a keyword click through rate of 3.25% or higher, and an advertisement group spent budget of 90% or less. Accordingly, provided the budget for the advertisement group is not almost exhausted (e.g., less than 90% spent), bids for high-performing keywords (e.g., keywords with the click through rate of 3.25% or higher) will be increased up to a maximum of $10. Additional requirements can be added by the user in response to the user selecting the "+Add requirement" link.

Frequency menu items 308 are used to define one or more frequency parameters for the rule. Frequency parameters are used to define the frequency and frequency conditions at which the rule is executed. As shown in FIG. 3, the rule is to be executed daily at 1:00 PM using performance data from the prior day. Other frequencies can also be used, such as weekly, monthly, or even a one-time frequency. Likewise, different times can be used, and performance data can be used from other time periods, such as data from the last week, or even data from the last month. In some implementations, rules can be defined with frequency parameters, and each rule defined with the default frequency parameters are executed at the same frequency.

The user interface 300 includes a name input field 310 in which a user may type the name of the rule, and a reporting menu item 312 through which a user may specify an e-mail reporting frequency.

The user interface 300 also includes a preview rule button 314. In some implementations, such as the implementation shown in FIG. 3, the rule must be previewed before the rule can be persisted to the scripted rules 130 for use in the automated management of an advertising campaign. Previewing the rule is described in more detail with respect to FIGS. 6A-6D.

A save button 316 and a cancel button 318 are also included in the user interface 300. As depicted in FIG. 3, the save button 316 is currently disabled, indicating that the rule has not been previewed. Once the rule is previewed, the rule may be saved by use of the save button 316. Once the rule is saved, the rule will be available in the application menu for user interfaces that correspond to campaign entities to which the rule is to be applied as specified by the apply menu 302. Accordingly, by creating multiple rules and associating each with different campaign entities, the scripting system 118 creates a context-based rule application environment.

The options available in the apply menu 302 can, in some implementations, differ depending upon the particular campaign entity level from which a user invoked the user interface 300. The options vary because the campaign management entities are associated according to a hierarchy in which the advertisement entities, budget entities, targeting entities, and bid entities are subordinate to the advertisement group entities, and the advertisement group entities are subordinate to the campaign management entities. Thus, in some implementations, a rule applied to any campaign entity at a particular node in a hierarchy may also be selectively applied to other campaign entities of the same type but at different nodes in the hierarchy.

For example, as described above, the user interface was invoked at an advertisement group level (i.e., invoked from a user interface in which keywords for a particular advertisement group are shown). Accordingly, the available options to which the rule may be applied are all keywords within the advertisement group, and selected keywords within the advertisement group. In some implementations, if the user interface were invoked at a campaign level (i.e., invoked from a previous user interface in which keywords for a particular advertisement campaign are shown), then the available options to which the rule may be applied are all keywords in the particular campaign, and a subset selected keywords within the advertisement campaign. Likewise, if the user interface were invoked from user interface in which keywords were shown for all advertising campaigns for a particular advertiser (e.g., an "all campaigns" level), then the available options to which the rule may be applied are all keywords for all campaigns, and a subset of selected keywords from the advertisement campaigns.

Accordingly, any one rule associated with an advertising campaign entity can further be associated with all campaign entities subordinate to the advertising campaign entity (e.g., targeting entities such as keywords). Likewise, the condition for the rule can also be defined for a campaign management entity subordinate to the advertising campaign entity (e.g., the targeting entities that are subordinate to the advertising campaign entity).

In some implementations, the user interface 300 is a default user interface for one of several default rules that are available to all advertisers. Other default rules at the keyword level include, for example, changing the max CPC bid, and pausing particular keywords. For example, the contextual submenu 214 of FIG. 2 includes a respective menu item for each of the user interfaces. Conditions necessary for defining events for the execution of particular operations to change the max CPC bid of keywords, and pausing particular keywords, can be defined by users in the respective user interfaces.

FIG. 4 is an example user interface 400 for ad group rules at an ad group level. The user interface 400 can, for example, be accessed through an automation menu, or through another user interface element that can be used to invoke a rule creation interface. The user interface 400 is being used to create a rule titled "Raise bids to first page CPC." The user interface environment is similar to the user interface 300 of FIG. 3. The rule being defined by the user interface 400 results in a 50% increase in the maximum cost per click for an advertisement group if two conditions are met. The first condition is that the advertisement group is a low performing advertisement group (e.g., with the click through rate less than 1%), and the second condition is that the budget for the advertisement group is not almost exhausted (e.g., less than 90% of the daily budget has been spent).

Thus, the condition of the rule is a click through rate threshold for the advertisement group defined by the advertisement group entity meeting a first threshold. The operation of the rule is adjusting a bid defined by a bid entity associated with the advertisement group entity so that the bid meets a cost per click value that increases the likelihood that an advertisement of the advertisement group is displayed.

The options available in the apply menu 402 can, in some implementations, differ depending upon the particular campaign entity level from which a user invoked the user interface 400. As shown in FIG. 4, the user interface 400 was invoked at an advertisement group level. Accordingly, the available options to which the rule may be applied to are selected advertisement group, all advertisement groups in a selected campaign, and all advertisement groups in all campaigns. In some implementations, if the user interface were invoked at a campaign level, then the available options to which the rule may be applied are selected advertisement groups, or all advertisement groups in a particular campaign. Likewise, if the user interface were invoked from an all campaigns level, then the available options to which the rule may be applied are selected advertisement groups, all advertisement groups, and all campaigns.

In some implementations, the user interface 400 is a default user interface for one of several default rules that are available to all advertisers. Other default rules at the advertising group level include, for example, pausing an advertisement group. For example, the contextual submenu 216 of FIG. 2 includes a respective menu item for each of the user interfaces. Conditions necessary for defining events for the execution of the particular operations associated with the advertising groups can be defined by users in the respective user interfaces.

FIG. 5 is an example user interface for campaign rules at an ad group level. In FIG. 5, the campaign management entity is an advertising campaign entity, and the conditions of the rule are a click through rate threshold for the campaign identified by the camping entity not meeting a first threshold and a traffic parameter (impressions) of the campaign not meeting a second threshold. The operation, upon execution, results in a pausing of the campaign provided the event defined by the conditions occur to preclude the serving of advertisements associated with the campaign.

The options available in the apply menu 502 can, in some implementations, differ depending upon the particular campaign entity level from which a user invoked the user interface 500. As shown in FIG. 5, the user interface 500 was invoked at an advertisement group level for a selected campaign. Accordingly, the available options to which the rule may be applied are currently selected campaign, and all campaigns. In some implementations, if the user interface were invoked at an all campaigns level for advertising campaigns, then the available options are selected campaigns and all campaigns. Otherwise, the only available option to which the rule may be applied is all campaigns.

In some implementations, the user interface 500 is a default user interface for one of several default rules that are available to all advertisers. Other default rules at the advertising group level include, for example, changing a daily budget. For example, the contextual submenu 218 of FIG. 2 includes a respective menu item for each of the user interfaces. Conditions necessary for defining events for the execution of the particular operations associated with the advertising groups can be defined by users in the respective user interfaces.

Previewing Execution

Figure 6B:
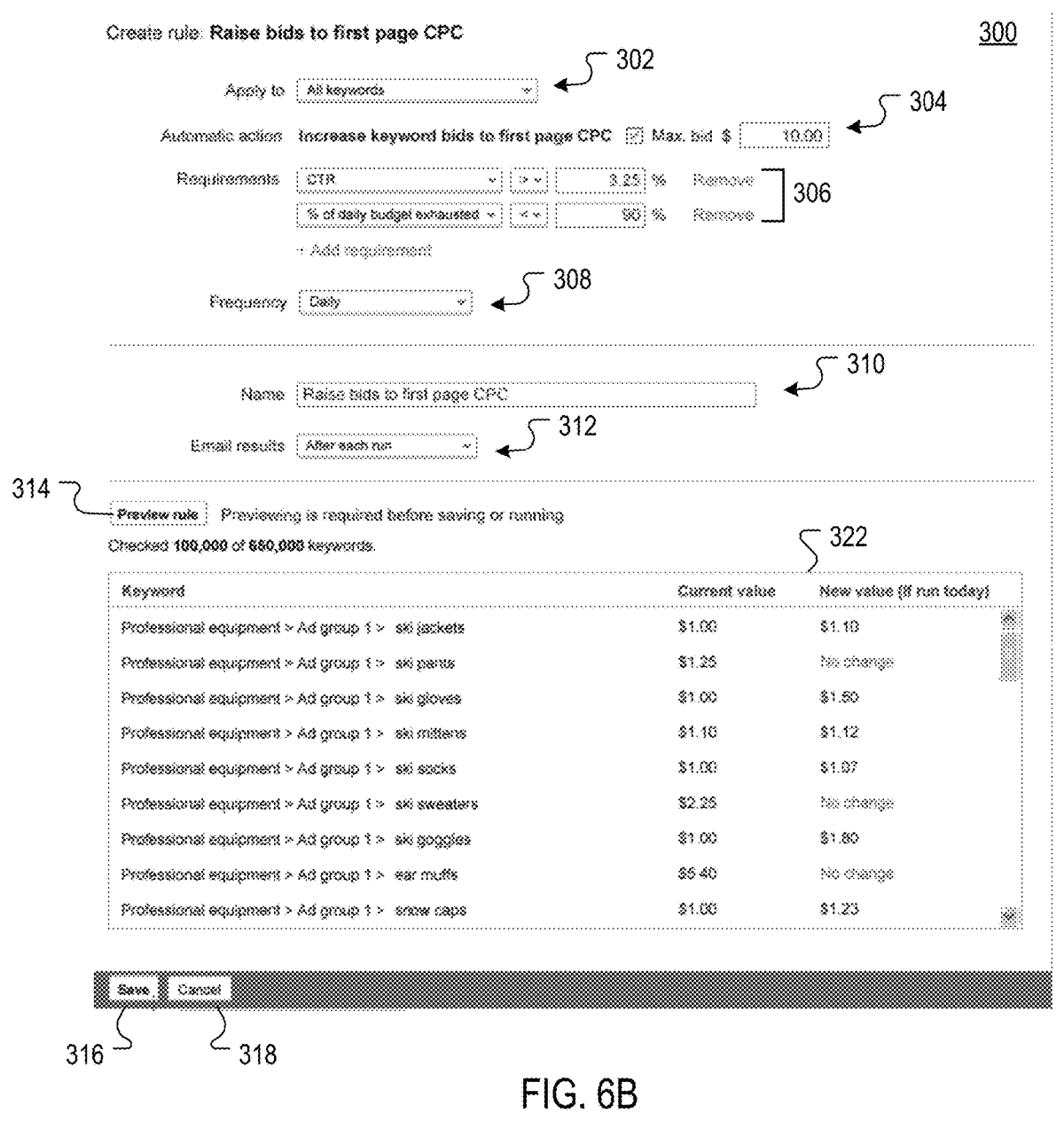

FIGS. 6A-6B are illustrations of user interfaces 300 and 320 for previewing rules. The user interface 300 of FIG. 6A is similar to the user interface 300 of FIG. 3, except that the preview rule button 314 has been selected by user, as indicated by the "running preview" message that is displayed next to the preview rule button 314.

In some implementations, when a rule is first defined by a user, the scripting system 118 designates the rule as a candidate rule. Candidate rules are rules that have not been accepted for use in automated management of an advertising campaign. The scripting system 118 requires that candidate rules be previewed before they can be accepted by users. The scripting system 118 executes the rule in a preview context to allow users to preview the effects of the operation on the campaign management entities. When executed in a preview context, the changes to the campaign management entities are not persisted to the campaign in 126.

Figure 6C:
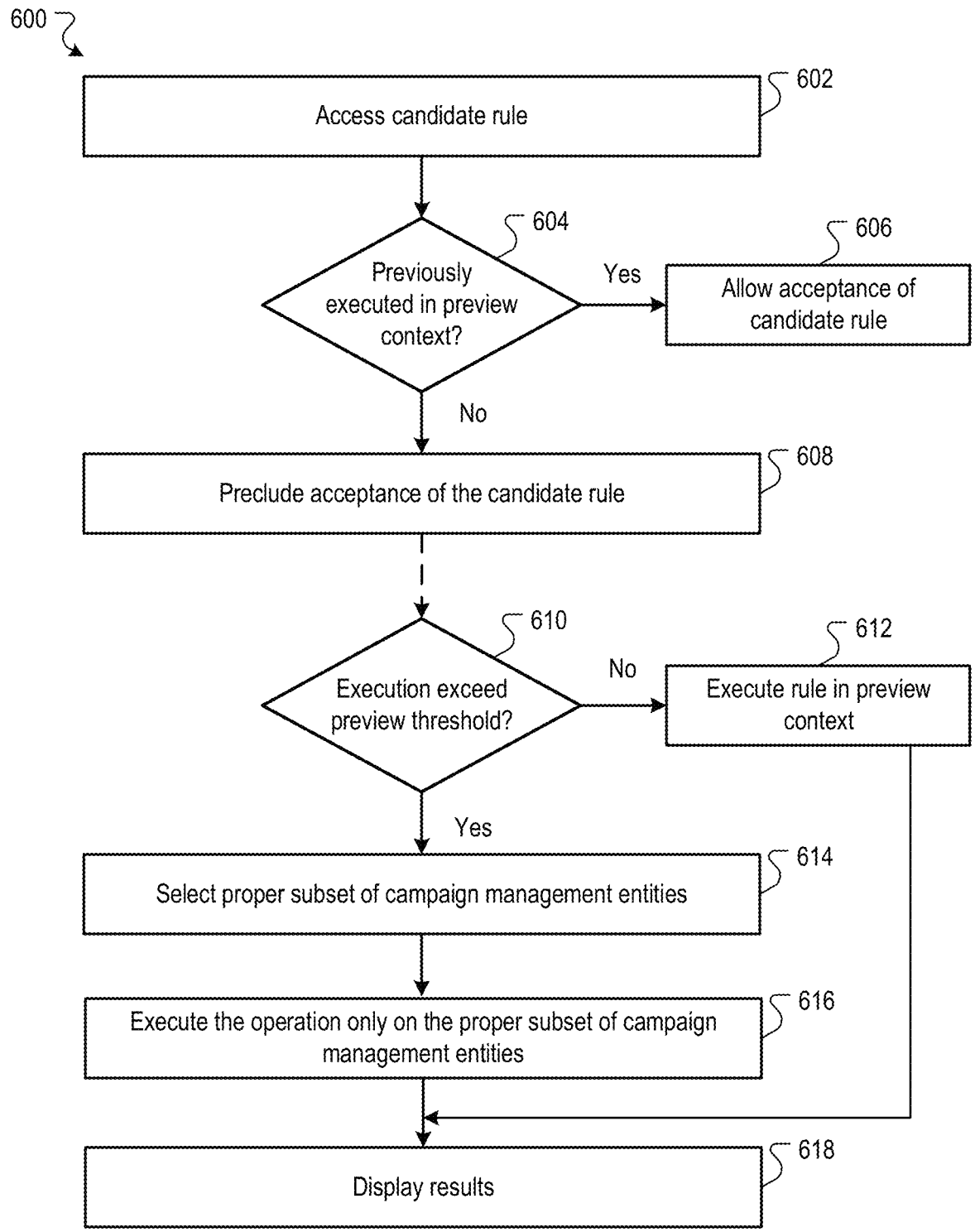
FIG. 6C is a flow diagram of an example process for executing a rule in a preview context.

The process flow from FIG. 6A to FIG. 6B is described with reference to FIG. 6C, which is a flow diagram of an example process 600 for executing a rule in a preview context.

In operation, the scripting system 118 accesses a candidate rule (602) and determines whether the candidate rule has been executed in a preview context (604). If the scripting system 118 determines that the candidate rule has not been executed in the preview context, then the scripting system precludes acceptance of the candidate rule for use in an automated management of the advertising campaign (608). For example, with respect to FIG. 3, the save button 316 is disabled because the scripting system 118 has determined that the candidate rule defined by the parameters displayed in the user interface 300 has not been executed in the preview context.

Assume that a user has decided that the conditions 306 are sufficient for the rule and the user wants to accept the rule. The user selects the preview rule button 314 to execute the rule in the preview context. After execution in the preview context, the scripting system 118 allows for acceptance of the candidate rule for use in automated management of the advertising campaign. For example, as shown in FIG. 6B, the user interface 320 includes preview results 322 that display the resulting candidate entity changes for the affected campaign entities. If the user is satisfied with the preview results 322, the user will press the save button 316 and the candidate rule will be saved as a scripted rule 130. Conversely, if the user is dissatisfied, the user may change the parameters associated with the operation or the conditions and preview the candidate rule again.

Often it is not necessary to execute the operation on all affected campaign entities when previewing a candidate rule. Furthermore, it is likely that the user will be able to determine whether the rule is acceptable after reviewing only a subset of affected campaign entities. Accordingly, in some implementations only a proper subset of campaign management entities for which an entity change is specified by operation is selected in the preview context. For example, in some implementations, up to a maximum number M campaign entities are selected by the scripting system 118, and the operation of the candidate rule is performed only on the selected campaign entities.

In other implementations, the scripting system 118 determines whether execution of the candidate rule would exceed a preview threshold (610). The preview threshold can be a maximum number of campaign management entities, or be a maximum processing time. In the case of the former, the scripting system 118 determines whether a number of campaign management entities for which an entity change is specified exceed the maximum number. If so, the scripting system 118 selects the proper subset of up to the maximum number of campaign management entities (614), performs the operation on the selected campaign entities (616), and displays the resulting changes for the proper subset of campaign management entities (618). In the case of the latter, scripting system 118 selects a number of campaign management entities for which the entity change is specified (614) and for which the processing time required to process the changes of the campaign management entities is less than the maximum processing time. The scripting system 118 performs the operation on the selected campaign entities (616) and displays the resulting changes for the proper subset of the campaign management entities (618).

Conversely, if the execution of the candidate rule would not exceed the preview threshold, the scripting system 188 executes the operation on the campaign management entities for which the entity change is specified (612), and displays the resulting changes (618).

Figures 7A, 7B:
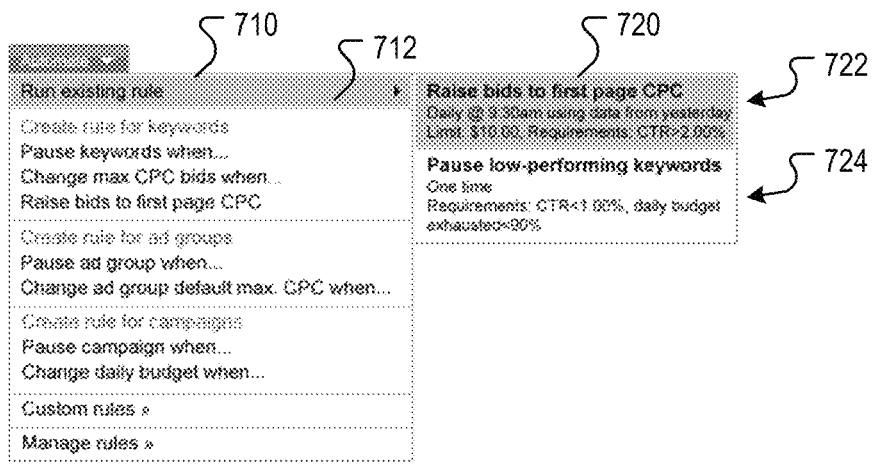
FIGS. 7A-7B are illustrations of user interfaces for executing rules on demand.

FIGS. 7A-7B are illustrations of user interfaces 710 and 730 for executing rules on demand. Once a rule has been accepted and persisted to the scripted rule status store 130, becomes available in automation menus. For example, in the automation menu 710, selection of the run existing rules submenu 712 causes the display to contextual menu 720.

The contextual menu 720 includes two submenus 722 and 724, each corresponding to one of two existing rules. The automation menu 710 is invoked from a user interface that is at a campaign level that corresponds to the campaign management entities to which the rules of the submenus 722 and 724 are associated, e.g., the automation menu 710 may have been invoked, for example, from the user interface 200 after the rules were created and saved. Conversely, if the user interface was at the campaign level and corresponded to ad groups, then the automation menu would of the type of automation menu 230 in FIG. 2B, and the submenus 722 and 724 would not be displayed, and keyword rules are not displayed in the automation menu 230. Thus, the saved rules will be available in the application menu for user interfaces that correspond to campaign entities and levels to which the rule is to be applied as specified by the apply menu 302. Accordingly, by creating multiple rules and associating each with different campaign entities and levels, the scripting system 118 creates a context-based rule application environment.

Each of the submenus 722 and 724 display the rule title, the frequency at which the rule is to be executed, and the corresponding conditions associated with the rule. If, however, the rule is selected using the run existing rule submenu 720, then the rule is executed independent of the frequency parameter associated with the rule.

In some implementations, when a rule is selected for execution, it is automatically executed and the resulting candidate entity changes are persisted to the campaign data store 126. In other implementations, the rule must be previewed when it manually selected before the changes are persisted to the campaign data store 126. For example, as shown in FIG. 7B, the resulting user interface 730 is generated in response to selection of the submenu 722.

The user interface 730 displays various parameter 732 that are defined by the rule, and preview results 750 that display the resulting candidate entity changes for the affected campaign entities. Several options are available to the user after the preview results 750 are displayed. In particular, the user may select an edit rule button 752, a run button 754, or cancel button 756. The edit rule button 752 generates a user interface as previously described with respect to FIGS. 3-5 in which the user may edit the various parameters of the rule. For example, if the user is not satisfied with the results of the preview, the user has the option of editing the rule.

Selection of the run button 754 causes the scripting system to execute the rule and perform the operation on all affected campaign entities, and persists the changes to the campaign management entities in the campaign data store 126. Selection of the cancel button 756 cancels the operation.

User Authorization

Figure 8A:
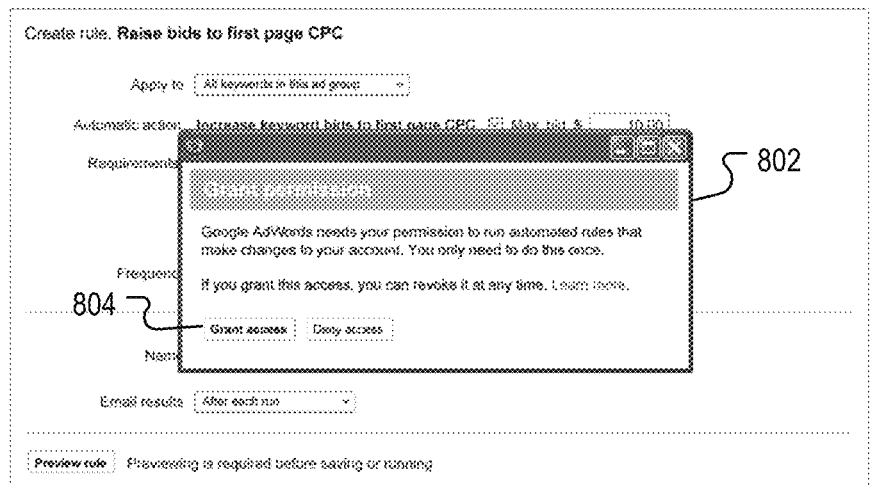
FIGS. 8A and 8B are illustrations of permission dialogs.
Figure 8B:
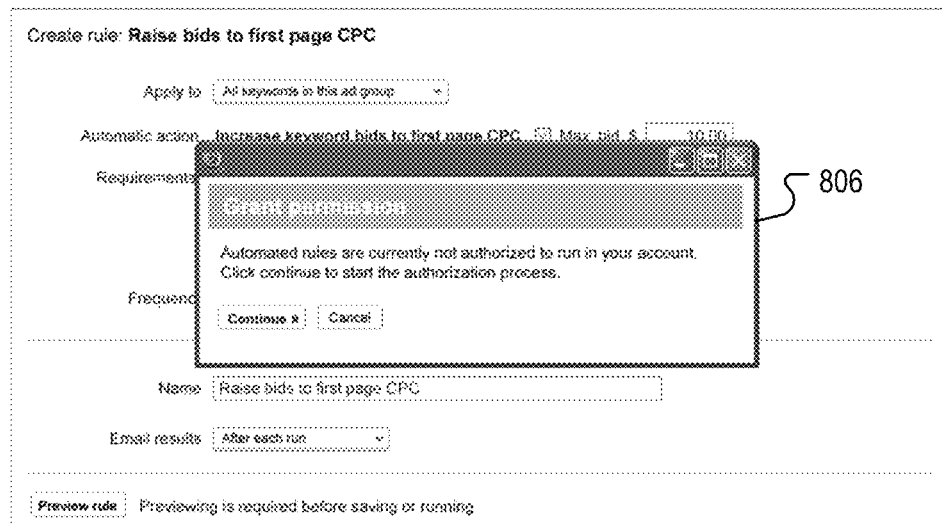

FIGS. 8A and 8B are illustrations of permission dialogs 802. In some implementations, the scripting system 118 associates each rule with the user identifier that identifies the user to define the rule. When the rule is executed, changes to campaign entities according to the specified entity change of the rule are attributed to the user identifier. Furthermore, by associating rules with user identifiers, the scripting system 118 can be required to be granted access to make changes to the advertising campaign automatically.

In operation, the scripting system 118 determines a permission status associated with the user identifier. The permission status is indicative of whether a user identified by the user identifier has permission to perform the operation of the rule. The scripting system 118 allows execution of the operation only if the permission status associated with the user identifier indicates that the user identified by the user identifier has permission to perform the operation of the rule.

The permission dialog 802 is generated first time a user attempts to define a rule. Provided the user grants access to the scripting system 118, and provided the user is authorized to make changes to an advertising campaign, the grant access button 804 is enabled. Selecting the grant access button 804 allows the user to proceed with defining a rule and performing the subsequent operations described above.

At a later time, the user's access privileges for automated rules may be revoked. In the event of this happening, the dialogue 806 is generated. The dialogue 806 informs the user that the automated rules are not authorized to run in the user's account.

Customized Operations for Rules

The rule creation user interface examples of FIGS. 3-5 above each included predefined operations 304, 404 and 504 for which the user could define variable values. These predefined operations define a set of default rules that are available to all advertiser users. However, in some implementations, the scripting system 118 provides a template user interface that facilitates the defining of a rule template that can be used to generate rules for customized operations. FIGS. 9A-9E are illustrations of user interfaces for developing customized rules for a campaign.

Figure 9A:
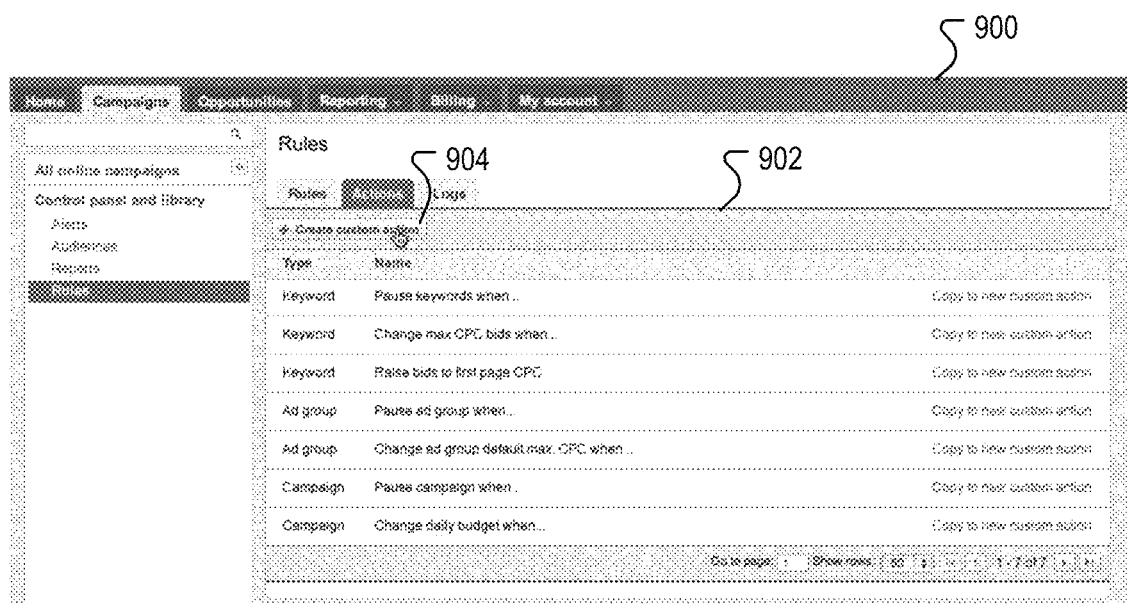

FIGS. 9A-9E are illustrations of user interfaces for developing customized rules for a campaign. In FIG. 9A, the user interface 900 displays an actions listing 902. The actions listing 902 lists operations for various rules. Within the actions listing 902 is a create custom actions button 904. Selection of the create custom actions button 904 causes a client device to request a resource from the scripting system 118 to display the template user interface 910 of FIG. 9B.

The template user interface 910 is used to generate a rule template that can be used to generate a rule that defines an operation and a corresponding event. The template user interface 910 includes input fields 912 in which a user may enter information, e.g., a name and a description for a custom operation for a rule.

The template user interface 910 also includes an entity selection menu 914 from which a campaign management entity can be selected from among different campaign entities of advertising campaign data. The example campaign entities shown in the entity selection menu 914 include an advertising campaign entity, an advertisement group entity, an advertisement entity, and a targeting entity.

Figure 9B:
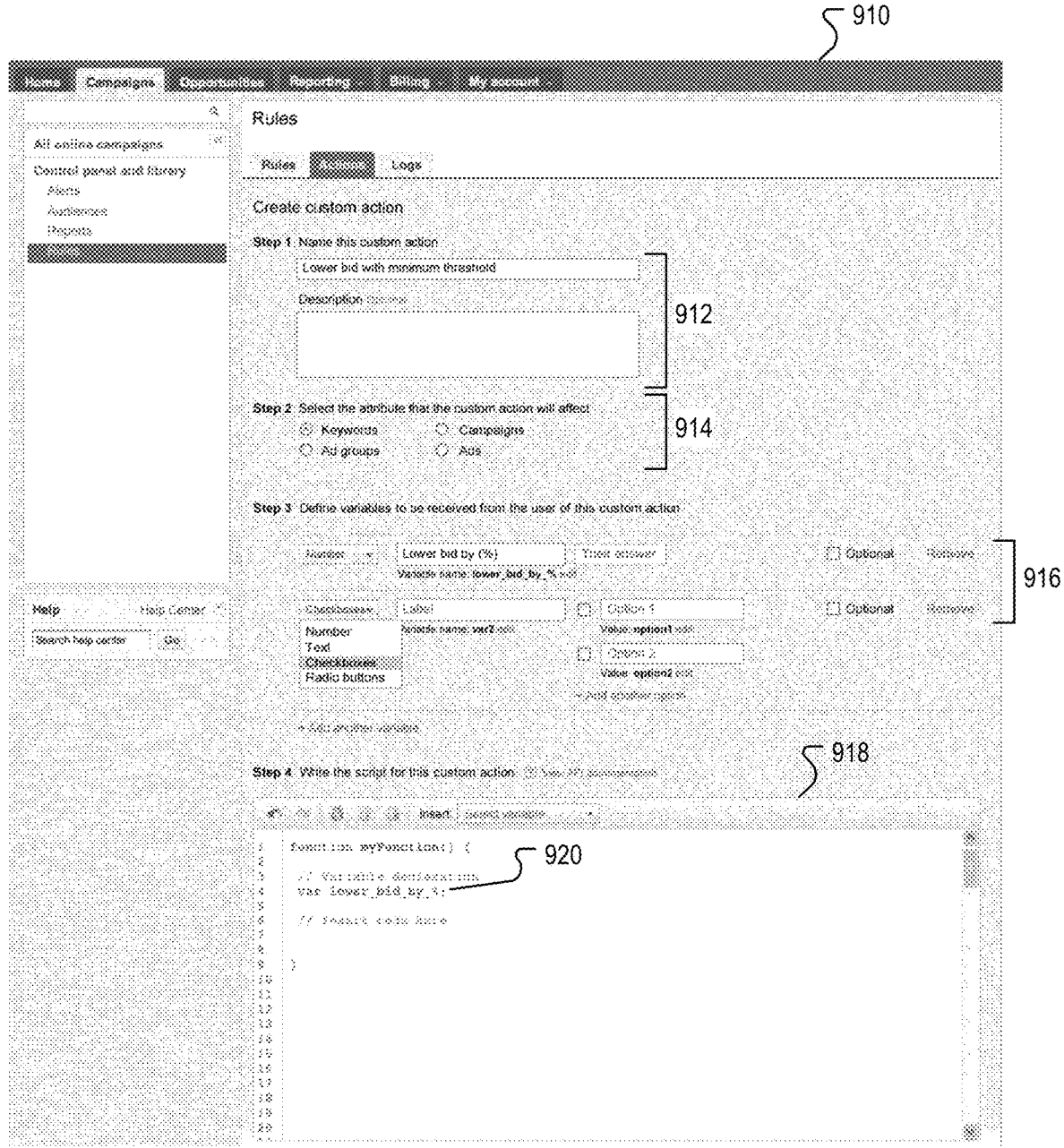

In response to receiving a selection of a campaign management entity, the custom operation is associated with the selected campaign entity so that the entity change affects the corresponding campaign entities. For example, as shown in FIG. 9B, the targeting campaign entity for keywords is selected, which results in the operation that is being define by use of the template user interface 910 being associated with keywords and operating on keyword campaign entities.

The template user interface 910 also includes variable declaration inputs 916 from which a variable type from different variable types can be specified. In some implementations, each variable corresponds to a selected campaign entity so that the available variables are dependent on the selected campaign entity. For example, if a targeting entity is selected (e.g., a keyword), the variables may be limited to a click through rate. In other implementations, the variables are independent of a selected campaign entity. For example, for the selected targeting entity, and variable can be selected (e.g., click through rate, percentage of daily budget exhausted, etc.) can be selected. Multiple variables can be selected by the user by use of the "+Add another variable" link option.

Template user interface 910 also includes a script editing environment 918 in which a script can be edited by a user. The script defines the customized operation and operates on corresponding campaign entities that correspond to the variables.

In some implementations, in response to receiving a selection of the variable type, a variable declaration is generated in the script in the environment 918. For example, as shown in FIG. 9B, the variable "lower_bid_by_%" has been generated in the variable declaration menu 916. In response, the variable declaration 920 is automatically generated in the script editing environment 918. In variations of this implementation, the user may specify the name of the variable by typing in the variable name in a text input field in the variable declaration menu 916, and the variable is named in accordance with the input. For example, the user has typed in the variable description "Lower bid by (%)", and in response to corresponding variable name "lower_bid_by_%" is automatically generated.

Figure 9C:
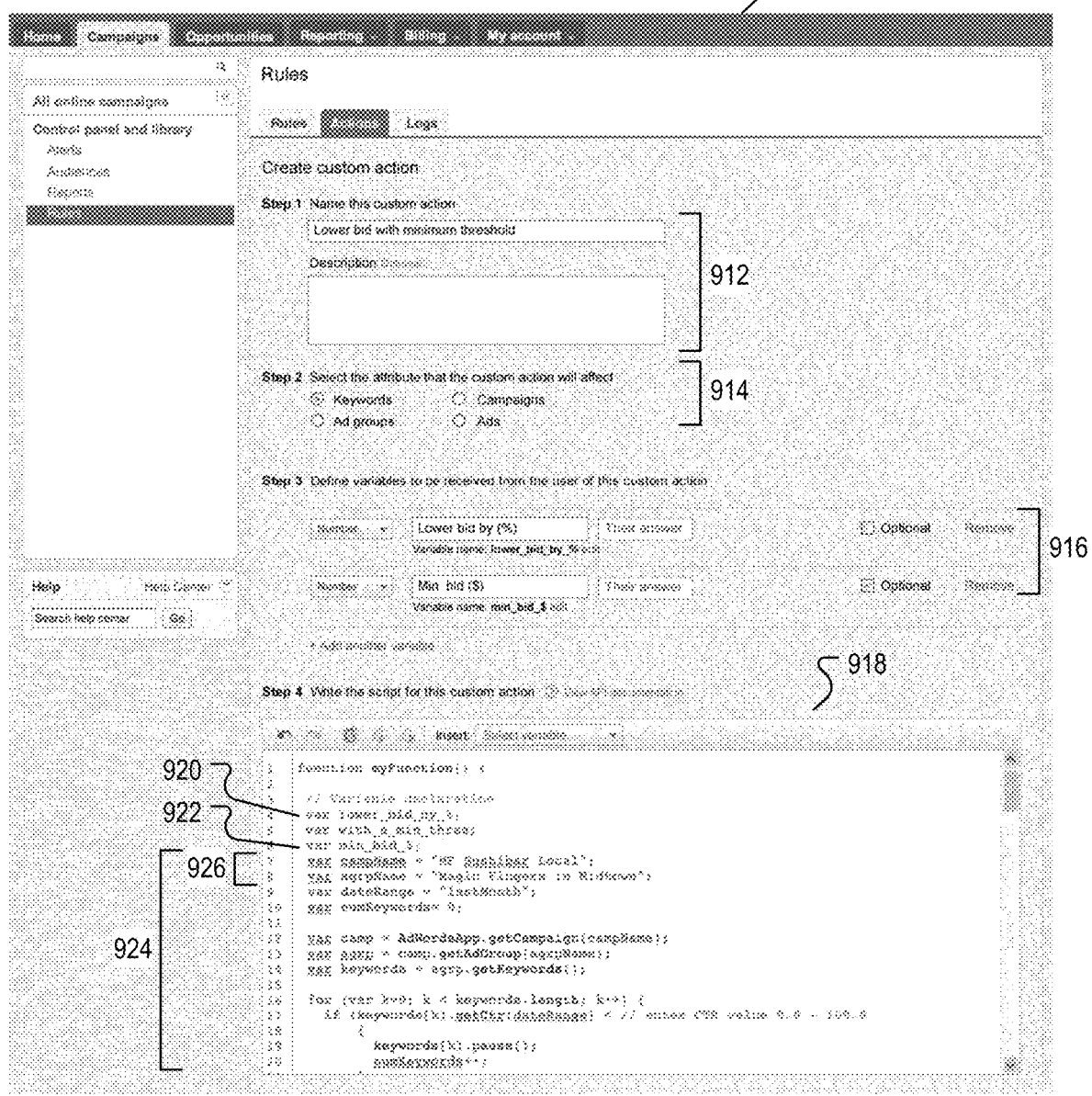

FIG. 9C shows the template user interface 910 after the user has selected two variables by use of the variable declaration menu 916, and written a corresponding script for the customized operation. In particular, two variables— lower_bid_by_% and min_bid_$—are declared in the variable declaration menu 916, and corresponding variable declarations 920 and 922 are generated in the script editing environment 918. In addition, the user has written additional script instructions 924. The example script instructions 924 include two instructions 926 that associate the operation with a particular advertising campaign entity and a particular ad group entity. Together the script instructions 924 and variable declarations 920 and 922 define a script for the custom operation.

After the user has completed the script, scripting system 118 stores the script defining the operations on the variables corresponding to the selected campaign entity as a rule template. The rule template may then be invoked to generate a rule in a manner similar to the way rule templates are invoked to generate rules as described with respect to FIGS. 3-5. For example, with respect to FIG. 9D, the user has invoked the user interface environment 930, which corresponds to keywords for the ad group and advertising campaign associated by the instructions 926 shown in FIG. 9C.

Accordingly, the automation menu 932, once activated, in addition to menu selections for default rules, includes a menu selection 934 that corresponds to the customized operation that the user defined using the template user interface 910 and associated with the specified campaign entities.

Figures 9D, 9E:
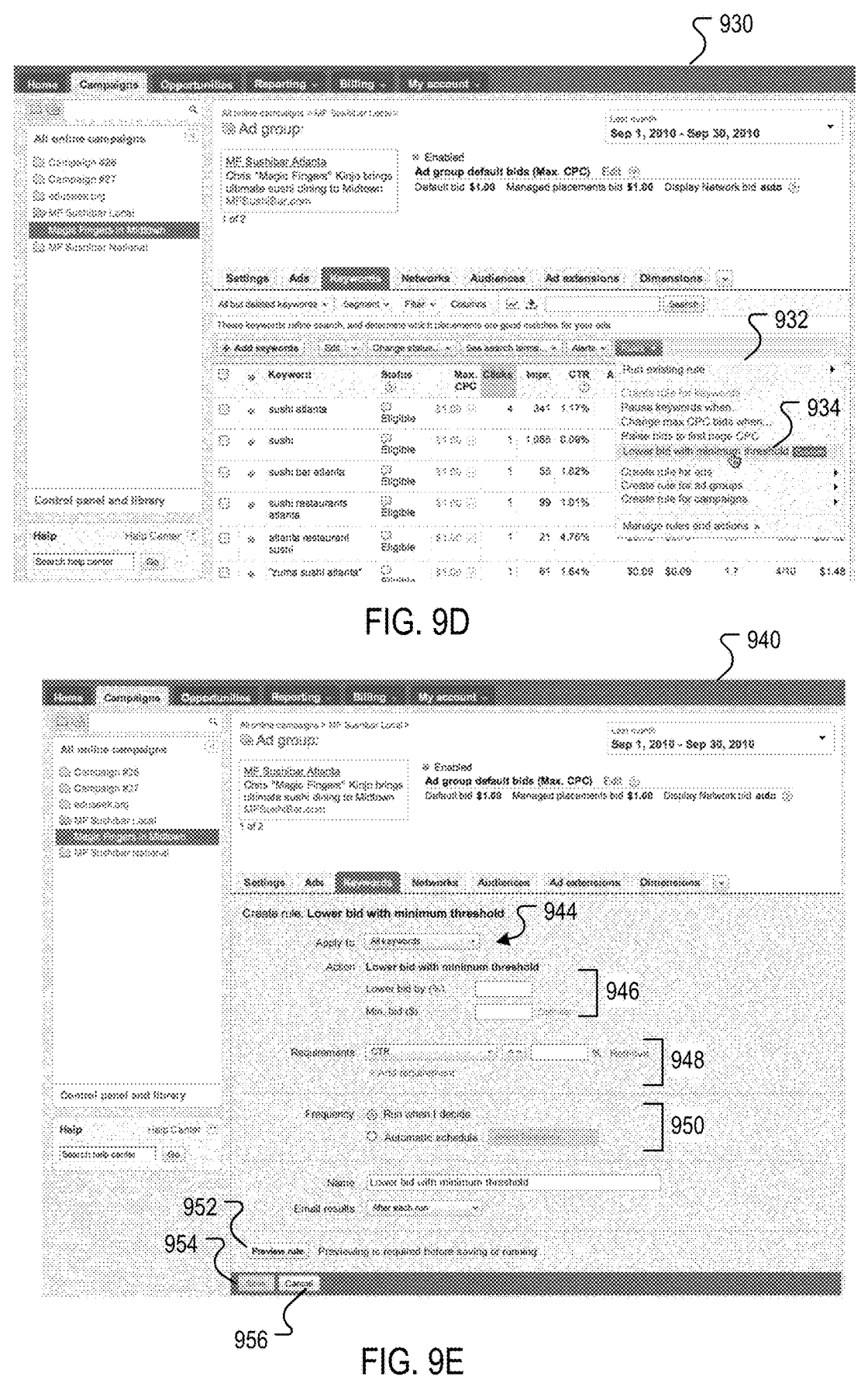

Selection of the rule template causes the user interface 930 to generate a rule creation user interface 940 of FIG. 9E. An apply menu 944 is used to select campaign entities to which the rule will be associated. As shown in FIG. 9E, the rule is currently selected to be applied to all keywords in the selected advertisement group. An alternative application selection could be, for example, a subset of keywords within an advertisement group.

The rule has a corresponding operation menu 946 for an operation that, when executed, results in a lowering of a bid by a percentage, with an optional minimum bid. For each variable declaration in the script, a corresponding input field for receiving a value for a variable corresponding to the variable declaration is provided in the operation menu 946. Because the user defined both of these as variable inputs when creating the customized operation, the user can select the value for each declared variable by entering the values in the operation menu 946.

Also associated with the rule are conditions that define the event that will result in execution of the operation. The conditions are defined by requirements 948 that can be selected by the user.

The user interface 300 also includes a preview rule button 952, and a save button 954. The save button is initially disabled, indicating that the rule has not yet been previewed.

In most other respects, a rule generated by use of the rule creation user interface 940 is subject to the same requirements and operations as described with respect to the rules generated by the interfaces of FIGS. 3-5 above.

Script Batching

The scripting engine 118, in some implementations, may have timing and resource limitations that are imposed for each execution of a rule. For example, the system 118 may have a total rule execution time limit of n hours (e.g., n=1, 2, 3 hours, etc.); and each instance of an execution of a script may have a different time limit, e.g., of m minutes. Other resource constraints may also be imposed.

Thus, in some implementations, the script system 118 partitions campaign entities into subsets, and instantiates, for each subset, a separate execution fragment in which the operation is executed on only the subset to change the campaign management entities that belong to the subset according to the specified campaign entity change. The size of each subset is selected so that the execution of each subset complies with the constraints imposed on each script execution, and the execution of all subsets complies with constraints imposed for each execution of a rule.

Figure 10A:
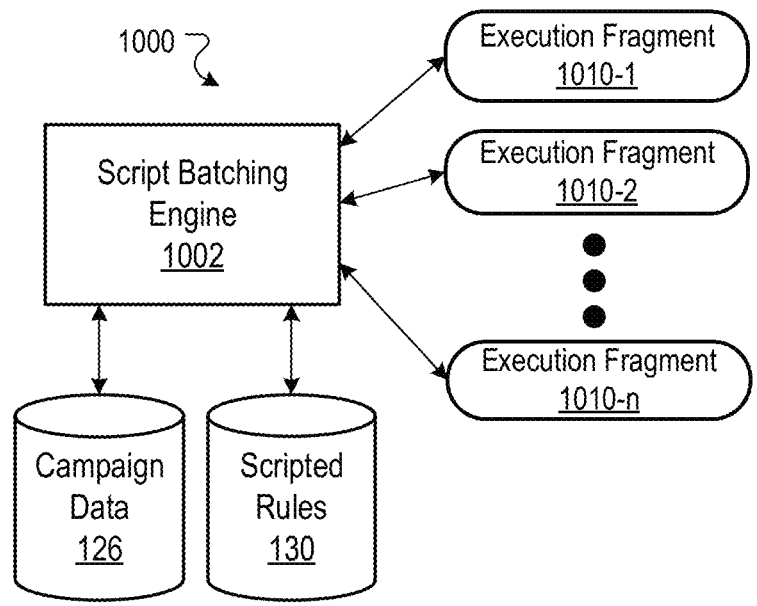
FIG. 10A is a block diagram of example system for partitioning the execution of a script into batches.
Figure 10B:
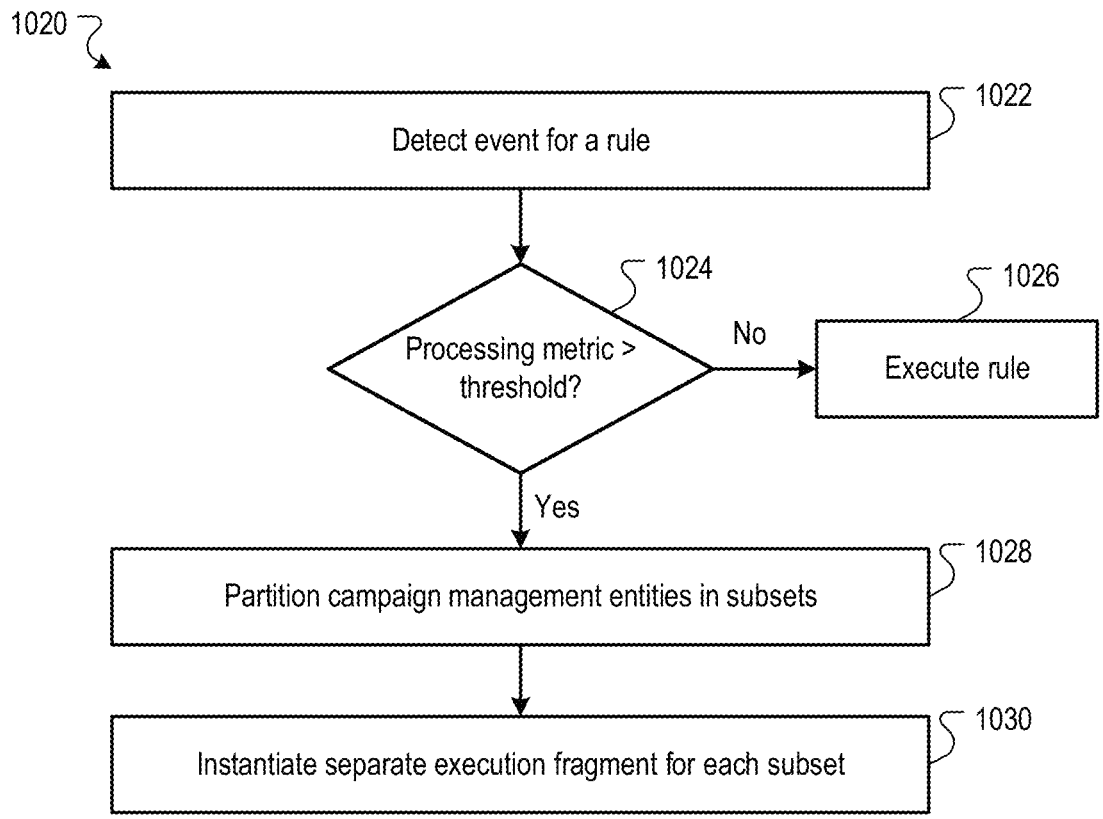
FIG. 10B is a flow diagram of an example process for partitioning the execution of a script into batches.

FIG. 10A is a block diagram of example system 1000 for partitioning the execution of a script into batches. Operation of the example system 1000 is described with reference to FIG. 10B, which is a flow diagram of an example process 1020 for partitioning the execution of a script into batches.

When the script system 118 detects an event for a rule (1022), the script system 118 invokes the script batching engine 1002 to determine whether the campaign management entities affected by the operation of the rule should be partitioned into subsets. In some implementations, the script batching engine 1002 determines whether a processing metric exceeds a threshold (1024). If the processing metric does not exceed the threshold, the script engine 118 executes the rule (1026) without fragmenting.

There are varieties of ways in which the script batching engine 1002 can determine whether a processing metric exceeds a threshold. For example, the script batching engine 1002 may determine whether a number of campaign management entities for which an entity change is specified exceeds a maximum number. In some implementations, each of the campaign management entities has a corresponding maximum number based on its respective entity type, and the script batching engine 1002 determines whether the number of campaign management entities for which an entity change is specified exceeds the corresponding maximum number of the respective entity type of campaign management entities. To illustrate, assume that a maximum number of entities in a fragment must not exceed X, and a different value of X is picked for each entity type (campaigns, ad groups, keywords, etc.). Accordingly, no more than 5000 keyword campaign entities can be handled by any particular execution fragment; no more than 500 ad group campaign entities can be handled by any particular execution fragment; and so on.

By way of another example, the script batching engine 1002 can determine whether a processing time required to process the changes of the campaign management entities exceeds a maximum processing time. The script batching engine 1002 can partition the campaign management entities into subsets so that, for each of the subsets, a respective processing time required to process the changes of the campaign management entities is less than the maximum processing time. The number of campaign management entities for each fragment may depend on observed performance of previously executed fragments.

If the script batching engine 1002 determines that the processing metric does exceed the threshold, then the script batching engine partitions the campaign management entities into subsets (1028), and then instantiates a separate execution fragment for each subset (1030). For example, the script batching engine 1002 can partition the campaign management entities into subsets that each have a cardinality that is less than the respective maximum number associated with the campaign management entity, or can partition the campaign management entities so that the execution of any one fragment does not exceed a maximum processing time.

In some implementations, the script batching engine 1002 instantiates execution fragments for subsets of campaign management entities that are subordinate to a same campaign entity in a hierarchy in serial, and instantiates execution fragments for subsets of campaign management entities that respectively subordinate to different campaign entity in parallel. For example, subsets of entities belonging to different ad groups may be processed in parallel, while subsets of entities belonging to the same ad group may only be processed in serial.

In some implementations, the script batching engine 1002 partitions the campaign management entities into subsets of campaign management entities that are subordinate to different campaign entities in the hierarchy so that, for each subset, a number of different campaign entities to which the campaign management entities that belong to the subset are subordinate is less than a maximum threshold. For example, the script batching engine 1002 may be required to ensure that the total number of ad groups to which the entities in a fragment belong must not exceed a maximum value Y. To illustrate, assume Y is 1,000. Thus, sending 5,000 keywords that belong to the same ad group to one execution fragment group is acceptable, but sending 5,000 keywords that belong to 2,000 different ad groups is not acceptable. Accordingly, in the latter case, the script batching engine will partition the keywords into, for example, 2,000 keywords within 1,000 ad groups and 3,000 keywords within the other 1,000 ad groups.

In some implementations, the script batching engine 1002 determines, for each separate execution fragment, an error status for the execution fragment that indicates whether the execution fragment executed without error, and persists changes for only execution fragments having an error status indicating the execution fragment executed without error. For example, if a change to a particular campaign entity in a particular execution fragment fails, then the entire update for the execution fragment fails. In some implementations, the script batching engine 1002, in response to detecting one or more change failures in response to execution of a fragment, removes the campaign management entities for which the changes failed from the subset and re-executes the execution fragment 1010 on the modified subset. Provided there are no failures, the changes are persisted to the campaign data.

Interoperability with External Application Services

In addition to rules being triggered by events that are observed by an advertising service that is used to manage advertising campaign, rules can be trigger by events associated with other application services that are external to the advertising service. This allows advertisers to manage their advertising campaigns from a variety of different application services, and have reports published in varying format for different application services. For example, cloud-based application services, such as spreadsheet service applications, database service applications, calendar service applications, and the like can be used in conjunction with the scripting system 118 for managing online advertising campaigns. The application services their respective applications to users and are hosted in a network external to client devices of the users, e.g., hosted on servers in a network that is separate from the network(s) in which the client devices are connected.

Figure 11A:
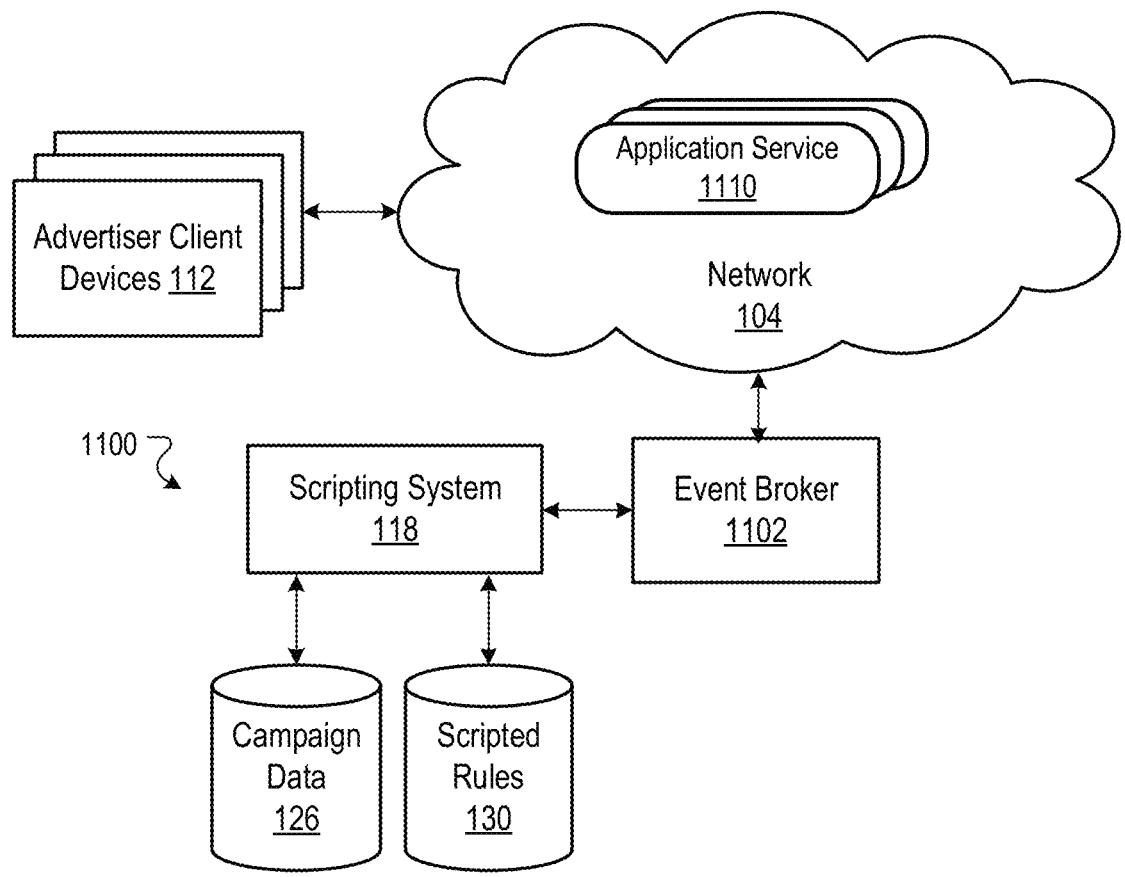
FIG. 11A is a block diagram of example system for monitoring services that are external to the advertising service for events defined by rules.
Figure 11B:
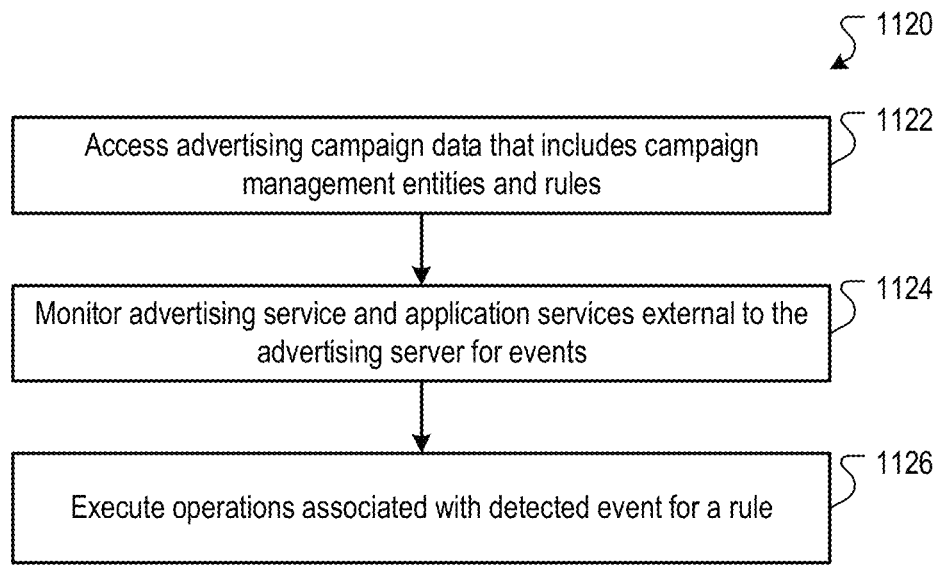
FIG. 11B is a flow diagram of an example process for monitoring services that are external to the advertising service for events defined by rules.

FIG. 11A is a block diagram of example 1100 system for monitoring services that are external to the advertising service for events defined by rules. Operation of the example system 1100 is described with reference to FIG. 11B, which is a flow diagram of an example process 1120 for monitoring services that are external to the advertising service for events defined by rule. In operation, the scripting system 118, using an event broker 1102, accesses advertising campaign data that includes campaign entities and rules (1122). The system 1100 then monitors advertising service and each of a plurality of application services that are external to the advertising service for events defined by the rules (1124).

For example, one application provided by an application service 1110 is configured to modify data describing campaign entities associated with an advertising campaign entity. An example of such an application is a spreadsheet. An event defined by the rule is the occurrence of modifications of the data describing campaign entities by the application. Accordingly, the operation defined by the rule specifies receiving the modifications of the data describing the campaign management entities from the application service and changing the campaign management entities in the advertising campaign data 126 according to the modifications of the data describing the campaign management entities. Thus, for example, the event change may be a change in data describing keyword bids in the spread sheet application, and the changes in the campaign management entities is a persisting of the changes in keyword bids to the campaign data 126.

By way of another example, at least one application provided by an application service is a scheduling application that specifies a rule schedule of when particular rules are to be executed, and the event defined by the rule is the scheduled execution of the rule as specified by the rule schedule.

The event for each rule can take into account performance metrics from advertising campaigns, and conditions for particular application services. For example, a particular rule to increase a CPC bid for low performing advertising groups may be scheduled to run on a weekly basis. However, rule may also run if a user of a calendar application service having a user identifier that matches the user identifier associated with the rule uses a calendar appointment to schedule the rule to run at a time different from the weekly basis. When the rule runs according the calendar schedule of the user, the changes to the campaign management entities are attributed to the user.

In addition to triggering events based on information provided by other cloud based application services that are external to the advertising service provided by the advertisement management system 102, the scripting system 118 can also publish results to other services. For example, an operation of a rule may specify an entity change for campaign entities associated with an advertising campaign entity, and other parameters of the rule may define generating and providing reporting data describing the entity change for a spreadsheet application provided by an application service. Such reporting data can describe the change in targeting keywords, the change in bids, the change in ad group advertisements, etc.

Conversion of Flat API to Hierarchical API

In some implementations, the advertising campaign data conforms to a flat Application Programming Interface (API), and thus the campaign management entities are not called in a hierarchical manner. However, the scripting system 118 presents the campaign management entities in a hierarchal manner by means of a hierarchal data-model API to access campaign entities. Accordingly, the scripting system 118 is configured to convert, during execution of a rule, each hierarchical data-model API call for campaign entities specified in a rule to a flat API call for the campaign management entities.

The flat API uses objects for data and services for data access. The hierarchical data-model API, on the other hand, uses objects for both data and data access. For example, assume that the keyword "pink roses" from the ad group "flowers" for the campaign "valentine" is required. The following series of flat API calls would be required to access the data in the campaign data 126:

Campaign=CampaignService.getCampaign
  ("name=valentine")
AdGroup=AdGroupService.getAdGroup
  ("name=flowers, CampaignId=Campaign.ID")
Keyword=KeywordService.getKeyword("text=pink
  roses, AdGroupId=AdGroup.ID")

Each of the calls above calls a service stub for data access and uses an object for the data. Additionally, each subsequent call for the ad group and keyword respectively passes the parameters of the identifier of the campaign "valentine" and ad group "flowers."

The scripting system 118, however, can use the following instructions according to the hierarchical data-model API:

Campaign=AdWords.getCampaign("name=valentine")
AdGroup=Campaign.getAdGroup("name=flowers")
Keyword=AdGroup.getKeyword("text=pink roses")

Instead of requiring the user to call a service stub and pass the necessary identifiers that are inherently absent in the flat API, the scripting system 118 allows users to write instructions that conform to an object hierarchy that is used to model the advertising campaign. The scripting system 118 automatically converts each hierarchical data-model API call for campaign entities specified in a rule to a flat API call for the campaign management entities.

Figure 12A:
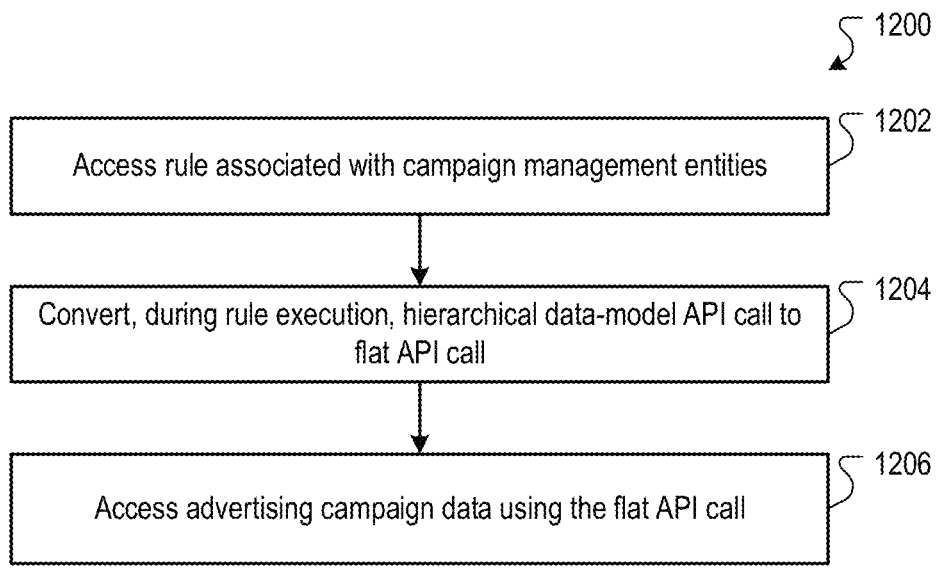
FIG. 12A is a flow diagram of an example process for accessing campaign data using a flat Application Programming Interface (API).

FIG. 12A is a flow diagram of an example process 1200 for accessing campaign data using a flat Application Programming Interface (API). The process 1200 can be implemented by the scripting system 118.

The scripting system 118 accesses rules, each rule associated with at least one of the advertising campaign entities (1202). The scripting system 118 converts, during execution of a rule, each hierarchical data-model API call for campaign entities specified in a rule to a flat API call for the campaign management entities (1204). Thereafter, the scripting system 118 accesses advertising campaign data using the flat API call (1206).

Each hierarchical data-model API call is a call that uses a first data object to specify a first campaign entity for a function of the data-model API call, and a second data object corresponding to a second campaign entity that is subordinate to the first campaign entity is used as an argument of the hierarchical data-model API. Conversely, each flat API call is a call that uses a service request and a data object to access campaign entities.

Figure 12B:
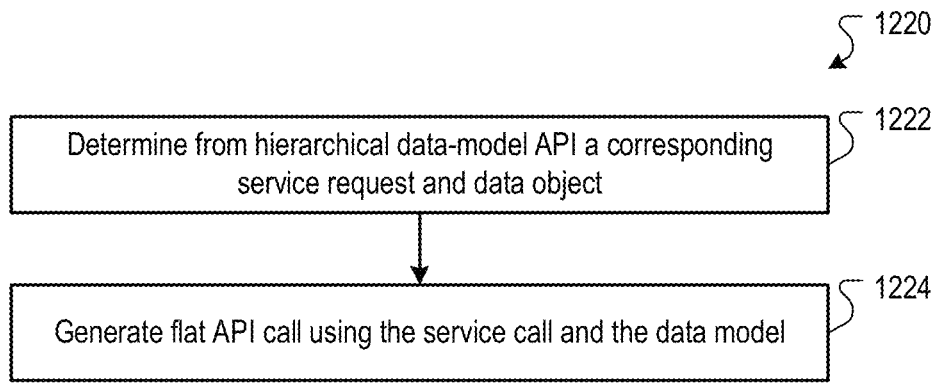
FIG. 12B is a flow diagram of an example process for determining a flat API call from a hierarchal data-model rule.

An example way of converting a hierarchical data-model API call for campaign entities specified in a rule to a flat API call for the campaign management entities is described with reference to FIG. 12B. The scripting system 118 determines, from at least one data-model API call specified in the rule, a corresponding service request and a data object for use in a flat API call (1222). For example, for the data model API call:

Campaign=AdWords.getCampaign("name=valentine")

the scripting service 118 determines that the "AdWords" object and the getCampaign( ) access request corresponds to the service request "CampaignService," and that the data object is "valentine." The correspondence of a service request and object can, for example, be predefined. Likewise, for the data model API call:

AdGroup=Campaign.getAdGroup("name=flowers")

the scripting service 118 determines that the "Campaign" object and the getAdGroup( ) access request corresponds to the service request "AdGroupService," and that the data object is "flowers."

The scripting service generates the flat API call using the service call and the data object determined from the at least one data-model API call (1224). For example, for the data model API call:

Campaign=AdWords.getCampaign("name=valentine")

the scripting service 118 generates the flat API call:

Campaign=CampaignService.getCampaign
  ("name=valentine").

Likewise, for the data model API call:

AdGroup=Campaign.getAdGroup("name=flowers")

the scripting service 118 generates the flat API call:

AdGroup=AdGroupService.getAdGroup
  ("name=flowers, CampaignId=Campaign.ID").

In general, converting each hierarchical data-model API call for campaign entities specified in the rules to a flat API call for the campaign management entities includes determining a corresponding service request based on the second data object, and generating the flat API call using the service request that uses the second data object and the first data object as arguments.

Reversion of Operation Changes

In some implementations, the scripting system 118 allows a user to configure a rule to temporarily modify campaign management entities until the occurrence of a reversion event. When the reversion event occurs, the values of the modified campaign entities are reverted to their original value. The reversion event can be a period of time, or some other condition specified by a user. For example, a user can define a rule to turn on campaigns for "Cyber Monday" in the morning of Cyber Monday and turn the campaigns off in the evening of Cyber Monday; or define a rule to increase budgets for a holiday season and revert the budgets back to their original levels after the holiday season; or define a rule to change bids for some keywords during the weekend and reverts the bids back on Monday.

The reversion event can also be a different condition defined by the user. For example, a user can define a rule to change bids for some keywords until N impressions (e.g., N=1,000) are served for those keywords. Additionally, the reversion can also be a manual input by the user, e.g., a user may, at any time after a rule has been executed, invoke a reversion command to revert the operation of the rule.

Figure 13A:
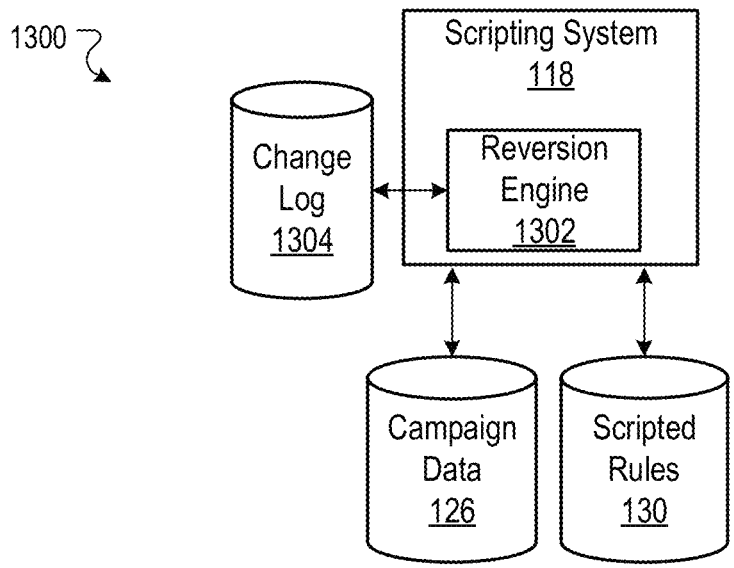
FIG. 13A is a block diagram of an example system for reverting an operation performed by a rule.
Figure 13B:
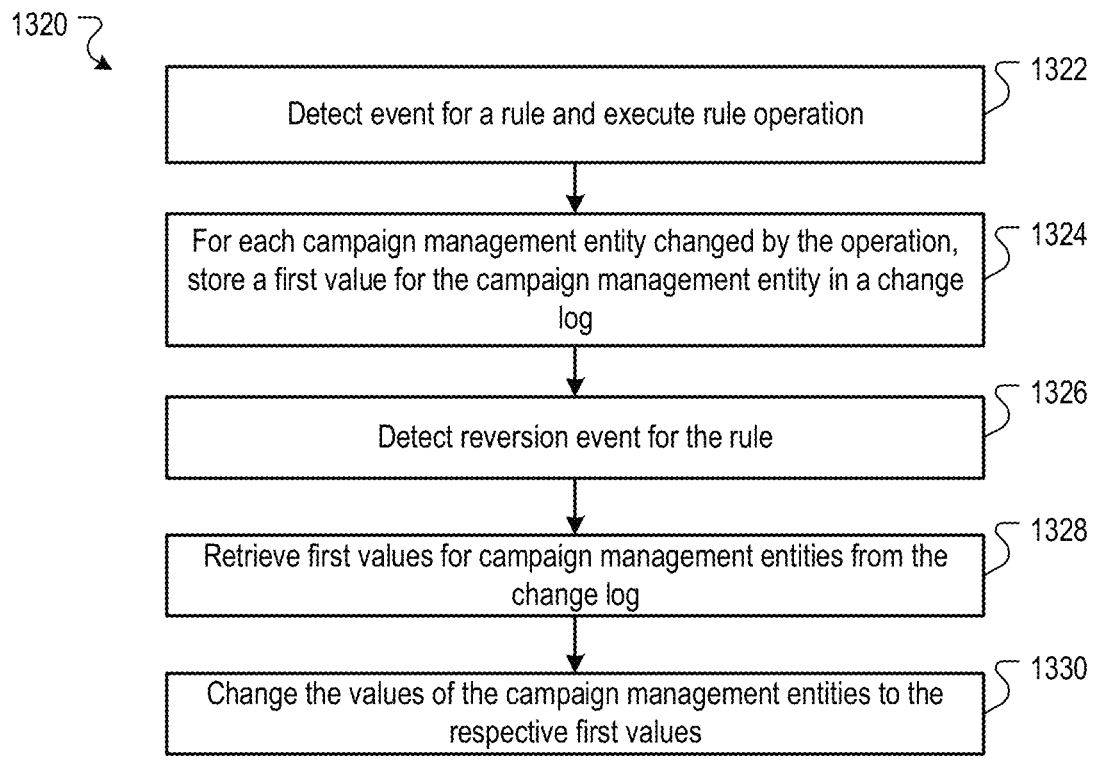
FIG. 13B is a flow diagram of an example process for reverting an operation performed by a rule.

FIG. 13A is a block diagram of an example system 1300 for reverting an operation performed by a rule. The system 1300 includes the scripting system 118 and a reversion engine 1302 that handles reversions of operations that are executed for rules. Operation of the example system 1300 is described with reference to FIG. 13B, which is a flow diagram of an example process 1320 for reverting an operation performed by a rule.

In operation, the system 118 detects a first event for a rule and executes the rule operation (1322). The detection of an event and the execution of the operation are as described above.

For each campaign management entity changed by the operation, the reversion engine 1302 stores a first value for the campaign management entity in the change log 1304 (1324). The first value is the value of the campaign management entity before being changed by the operation. For example, if a bid for targeting entity is changed from $0.50 to $0.75 as a result of a rule operation, the first value that is stored is $0.50. The first value is associated with its corresponding instance of the campaign entity, and is also associated with an execution identifier that identifies the instance of the execution of the rule. As many rules may be executed at different times, the execution identifier allows the reversion engine 1302 identify the particular changes that are attributed to a particular execution of a particular rule.

After the execution of the rule, the scripting system 118 detects a reversion event for the rule (1326). As described above, the reversion event can be time based, or based on some other condition, or even manually caused by the user.

In response to the detection of the reversion event, the reversion engine 1302 retrieves the first values for campaign management entities that were changed by the operation of the rule from the change log (1328), and then changes the values of the campaign management entities back to their respective first values (1330).

In some implementations, all of the campaign management entities that were changed by a rule operation revert to their respective first values. In other implementations, however, some of the campaign management entities that were change may not be changed back to their respective first values. For example, subsequent to the execution of the rule and before the occurrence of the reversion event, another rule that resulted in changes to some of the entities changed by the first rule may have been executed. Accordingly, it may not be desirable to revert to the first value, as the reversion of the first rule would effectively revert the operation of the second rule. Similarly, subsequent to the execution of the rule and before the occurrence of the reversion event, the user may have manually changed the values of some of the entities, and it may not be desirable to revert to the first value, as the reversion of the first rule would effectively overwrite the changes the user specified.

In general, the value of a particular campaign entity may only revert in response to a reversion event if the value has not changed since the execution of the rule that is being reverted. There are several ways in which the reversion engine 1302 can determine whether a particular campaign entity that has been changed by a rule operation should be reverted. For example, during the execution of the rule, the reversion engine 1302 stores a second value for the campaign management entity in the change log 1304. The second value is the value of the campaign management entity as changed by the operation. Thus, the change log 1304 now stores, for each changed entity, the value of the entity before the change and the value of the entity after the change. When a reversion event for the rule is detected, the reversion engine 1302 determines, for each of the second values for campaign management entities stored in the change log, whether the second value for the campaign management entity matches a current value of the campaign management entity. If there is a match, then it is highly likely that the value has not changed (i.e., it is unlikely that a subsequent changes resulted in the same second value). Accordingly, the reversion engine 1302 changes the value of the campaign management entity to its corresponding first value stored in the change log. However, if the second value of the campaign management entity does not match the current value of the campaign management entity, then the reversion engine 1302 does not change the value of the entity.

In a variation of this implementation, the reversion engine 1302 stores a change flag value for each changed campaign entity relative to each execution identifier. After a rule is executed, the change flag for each particular campaign identifier and execution identifier is 0, indicating the value of the campaign entity has not been changed since the execution of the rule. If the entity value is changed at a later time and before a reversion event for the particular execution identifier, then the change flag associated with the particular execution identifier and entity is changed to 1, indicating the campaign entity has changed since the execution of the rule.

Use of the change flag reduces the likelihood of a false negative detection of a subsequent change. While such false negative detections are unlikely for specific variables that have a wide range of values (e.g., bids), false negative detections are more likely to occur for binary variables (e.g., suspension/activation of a keyword) if the binary variable are changed several times.

When a reversion event for a particular execution identifier is receive, the reversion engine 1302, for each of the campaign management entities changed by the operation associated with the execution identifier, evaluates the change flag for the entity and execution identifier and determines whether the campaign management entity was changed after the change by the operation. Only if the change flag indicates that the campaign management entity was not changed after the change by the operation does the reversion engine 1302 change the value of the campaign management entity to its corresponding first value stored in the change log 1304.

Reversion events can be defined by the user by use of a rule user interface. For example, a reversion event selection menu item can be added to any of the user interfaces described above. In some implementations, if a frequency parameter is selected, the scripting system limits a time period of a reversion event to within the time period defined by the frequency parameter. For example, if a rule is to be executed weekly, the reversion event time period may be limited to one week or less.

Contextual Environments for Campaign Management

Figure 14A:
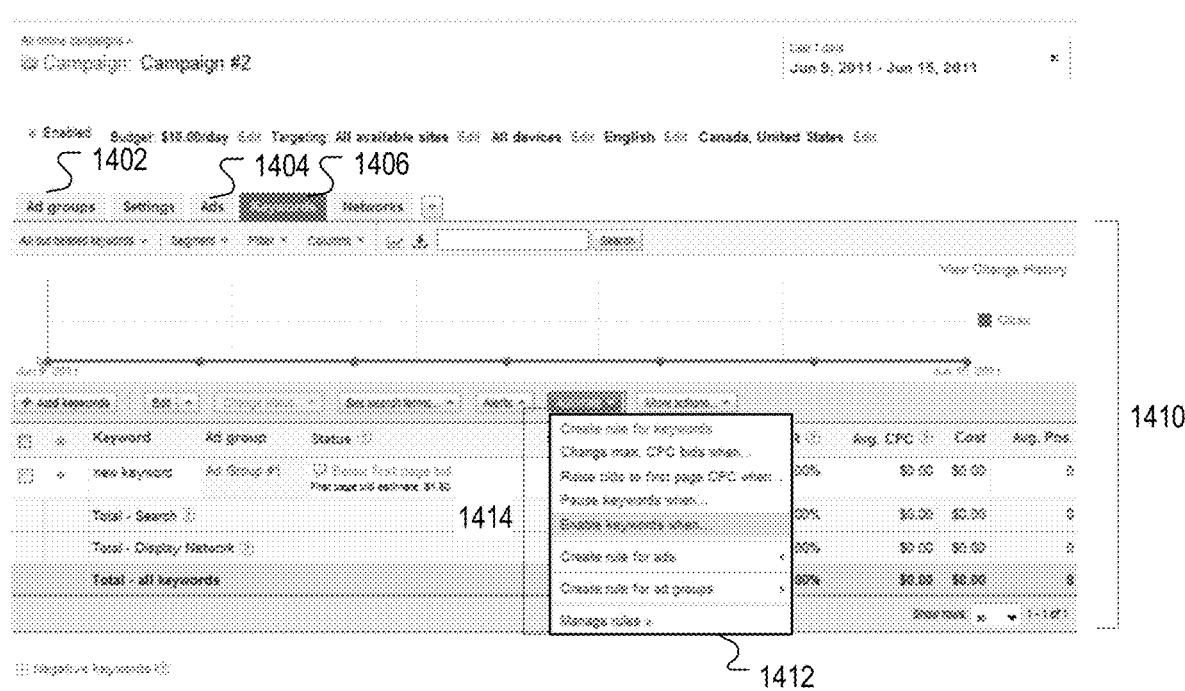
FIGS. 14A-14D are illustrations of a user interface in which environments may be contextually selected in response to a selection of a menu operation.

As described above, the user interfaces may be used to create rules for different campaign entities at different campaign levels. For example, FIG. 14A is an illustration of a user interface 1400 for a campaign management application. The user interface 1400 includes environment selectors (tabs) 1402, 1404 and 1406 for the application. Each selector corresponds respective user interface environments that provide editing tools for particular data sets that respectively correspond to the user interface environments. For example, for a selection of the tab 1406, which corresponds to keyword targeting entities, a user interface environment 1410 that is an editing environment for keyword entities is displayed. Selection of tabs 1402 and 1404 would cause the user interface 1400 to transition to interface environments for advertisement group entities and advertisement entities, respectively.

From any particular interface environment, a user may select to generate a rule for any particular campaign entities. For example, in FIG. 14A, the user has selected the automate menu 1412 that causes the display selection options 1414 that correspond operations on a first data type (e.g., the options for "Create rule for keywords") and other data types (e.g., the options for "Create rules for ads" and "Create rules for ad groups"). The user may select from any of these options.

Figure 14B:
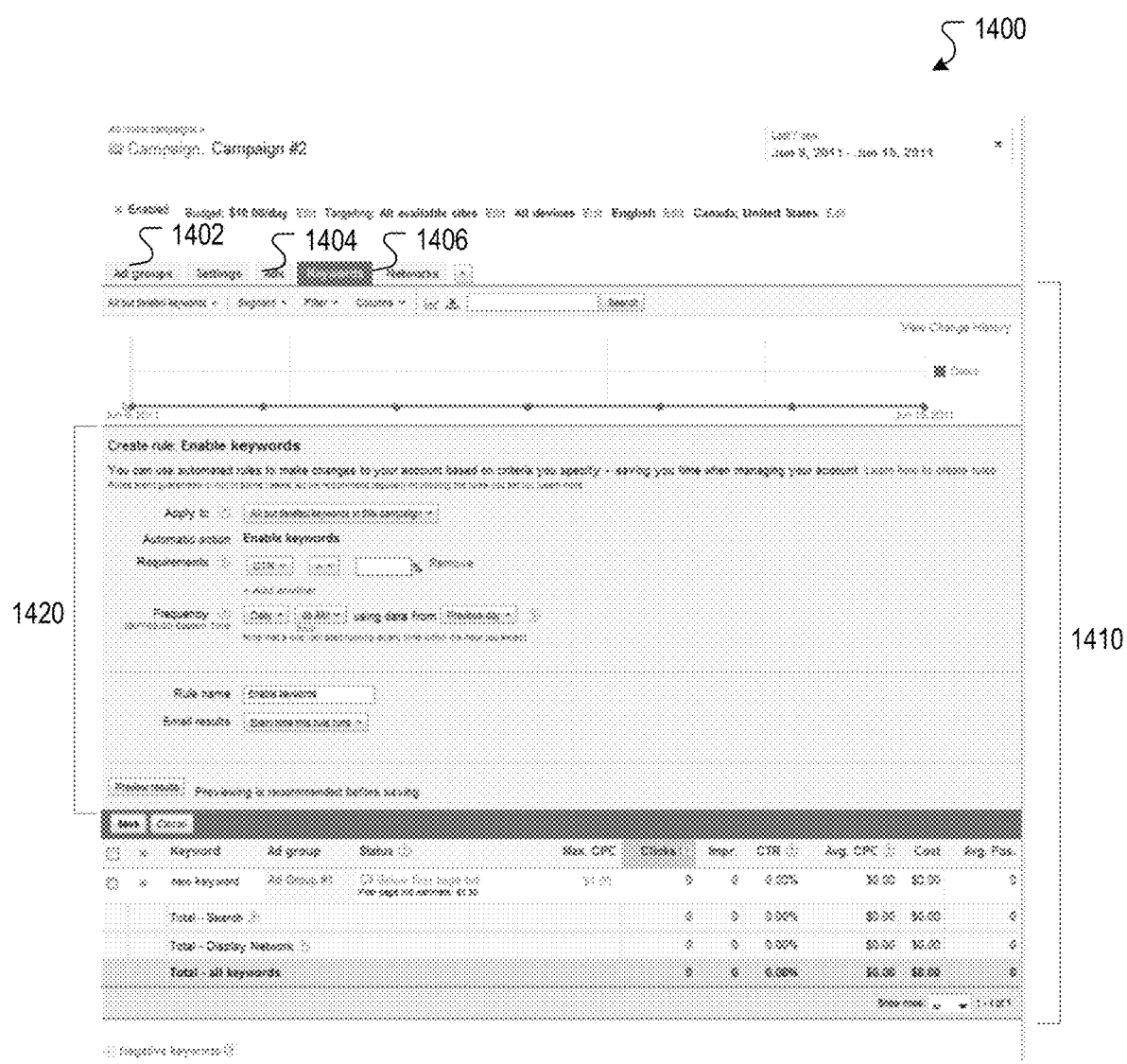

Often a user may decide to create a rule for a particular campaign entity from a user interface environment for that campaign entity. For example, FIG. 14B is an illustration of the user interface 1400 after the user has selected the "Enable keywords when . . . " menu option. The user interface 1400 of FIG. 14B is the same as in FIG. 14A, except that it now includes an operation user interface portion 1420 displayed within the user interface environment 1410. The operation user interface portion 1420, for example, is a user interface that can be used to create a rule to enable keywords.

Figure 14C:
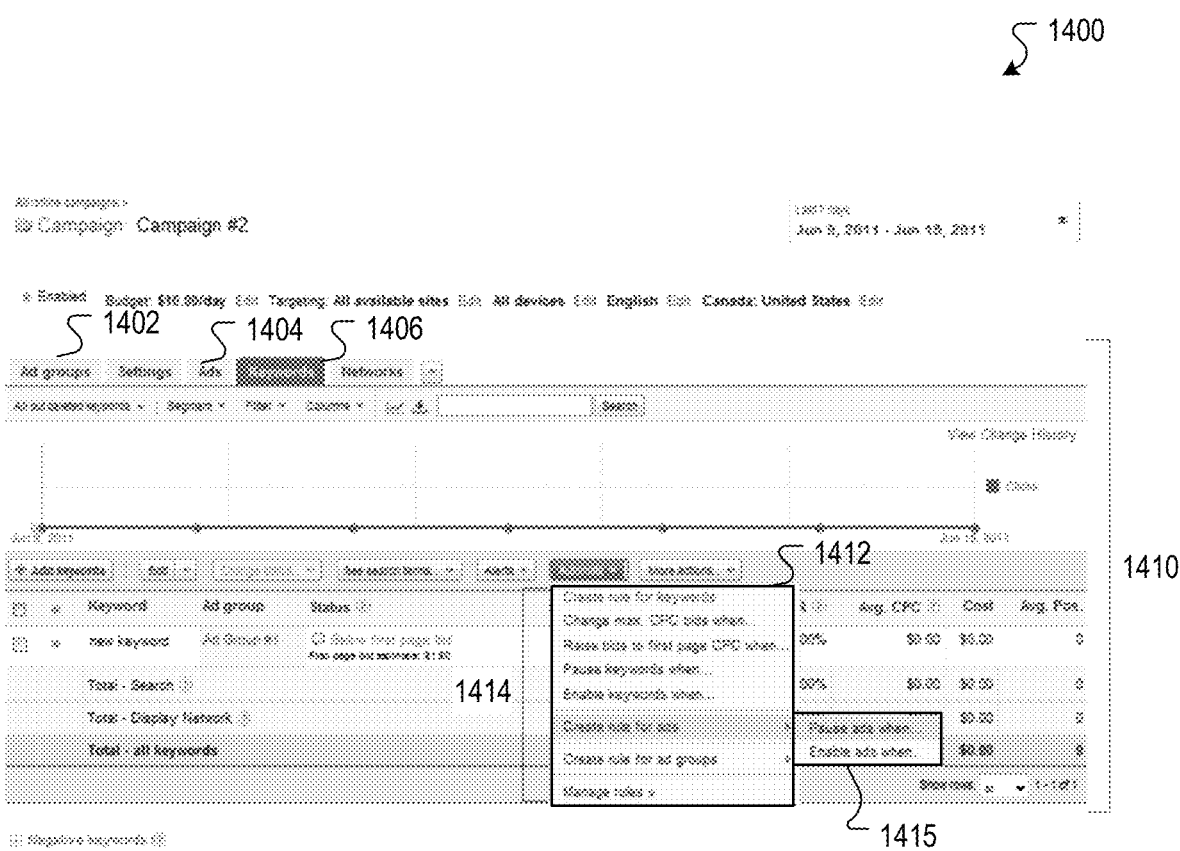
Figure 14D:
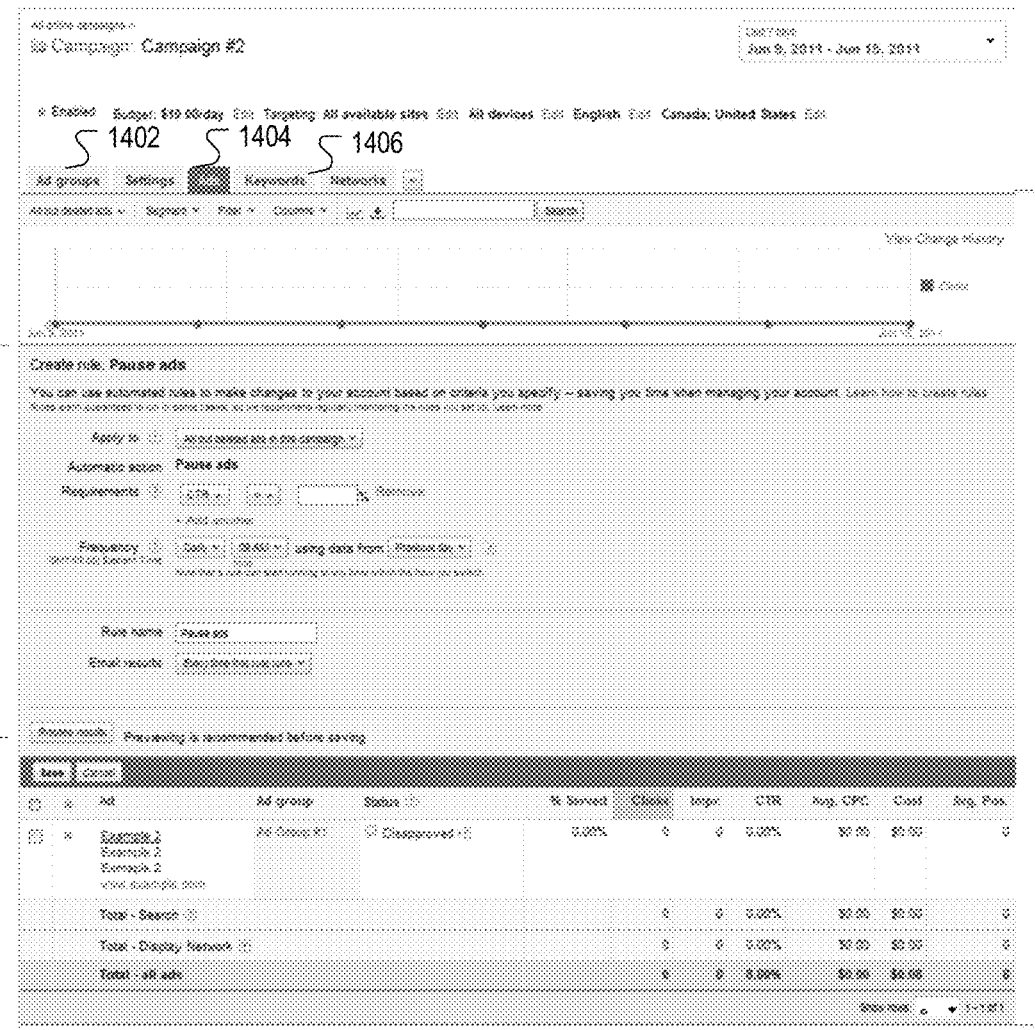
Figure 15:
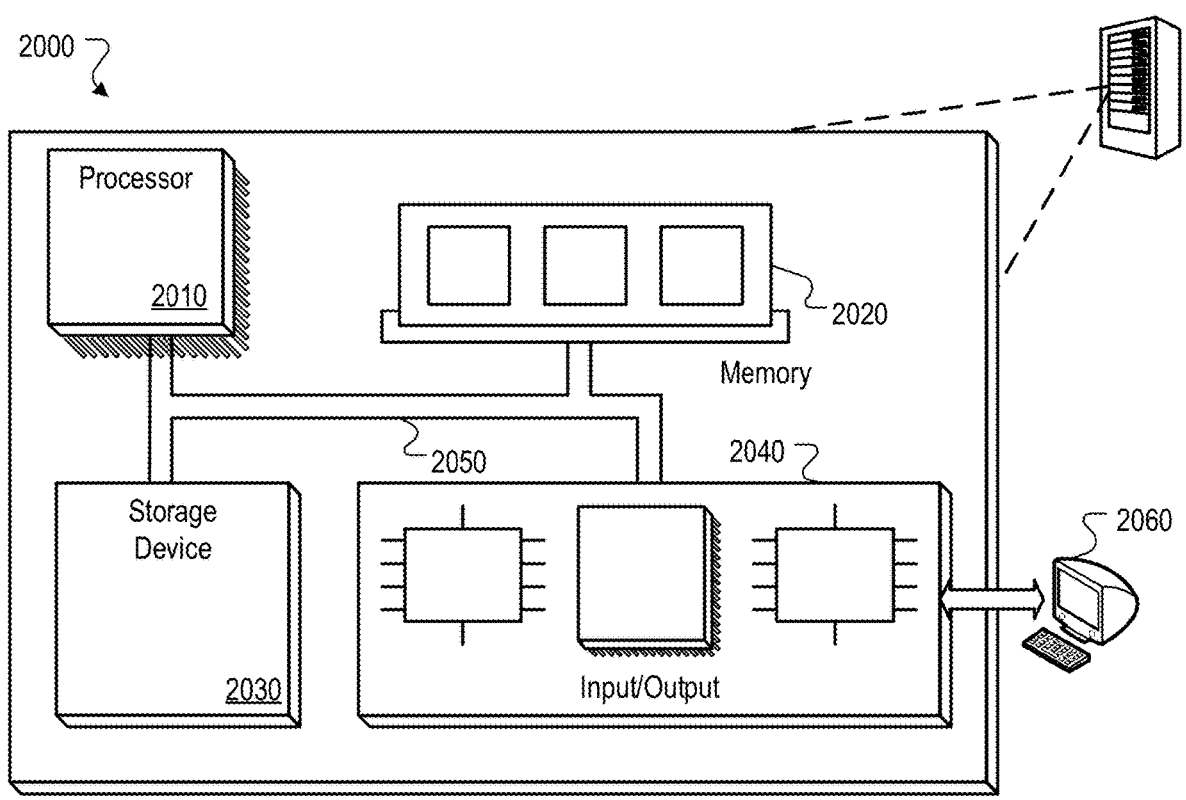
FIG. 15 is a block diagram of a data processing apparatus system.

However, a user may just as often decide to create a rule for a particular campaign entity this does not correspond to the currently selected user interface environment. For example, in FIG. 14C, the user has selected the selection option "Create rule for ads", and the resulting contextual rule options "Pause ads when" and "Enable ads when" 1415 are displayed. In response to the user selecting the "Pause ads when" option, the user interface 1400 transitions to the display as illustrated in FIG. 14D. The user interface 1400 of FIG. 14D differs from the interface as depicted in FIG. 14A in several respects. First, an operation user interface portion 1440 that correspond to a user interface for creating a rule pause advertisements is shown. Additionally, the user interface 1400 has transitioned to the user interface environment 1430, which corresponds to advertisement entities. Additionally, the selection tab 1404 is now highlighted, which also indicates the transition from the keyword targeting entity user interface 1410 to the advertisement entity user interface 1430.

Accordingly, invocation of rule operation in a first user interface environment can cause the user interface 1400 to automatically transition to another user interface environment if the first user interface environment does not correspond to the rule operation. This transition facilitates an intuitive navigation from any interface environment to a rule generation environment with only a single command. As there are multiple combinations of environments and rules, the automatic transition of an underlying environment that corresponds to a selected menu option saves time for the user.

While the contextual change of a user environment has been described in the context of an advertisement management system application environment, the contextual change features described above can be used in other applications of different types, as appropriate.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

An example of computing system in which the above-described techniques can be implemented is shown in FIG. 14, which shows a block diagram of a data processing apparatus system. The system 2000 can be utilized to implement the systems and methods described herein. The architecture of the system 2000 can, for example, be used to implement a computer client, a computer server, or some other computer device.

The system 2000 includes a processor 2010, a memory 2020, a storage device 2030, and an input/output device 2040. Each of the components 2010, 2020, 2030, and 2040 can, for example, be interconnected using a system bus 2050. The processor 2010 is capable of processing instructions for execution within the system 2000. In one implementation, the processor 2010 is a single-threaded processor. In another implementation, the processor 2010 is a multi-threaded processor. The processor 2010 is capable of processing instructions stored in the memory 2020 or on the storage device 2030.

The memory 2020 stores information within the system 2000. In one implementation, the memory 2020 is a computer-readable medium. In one implementation, the memory 2020 is a volatile memory unit. In another implementation, the memory 2020 is a non-volatile memory unit.

The storage device 2030 is capable of providing mass storage for the system 2000. In one implementation, the storage device 2030 is a computer-readable medium. In various different implementations, the storage device 2030 can, for example, include a hard disk device, an optical disk device, or some other large capacity storage device.

The input/output device 2040 provides input/output operations for the system 2000. In one implementation, the input/output device 2040 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 2060.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   providing, for presentation at a client device, a user interface that enables a user to create a rule for a campaign;
   receiving, from the client device, data specifying a rule associated with a set of campaign entities of the campaign and that was created using the user interface, wherein the rule defines an operation and a corresponding event, the event being an occurrence of a condition, wherein the operation (i) is executed in response to detecting that the condition has occurred and (ii) specifies a change to a value of each entity in the set of entities;
   monitoring the condition defined by the rule;
   detecting that the condition has been satisfied; and
   in response to detecting that the condition has been satisfied, executing the operation, and in response to the execution, changing the values of the entities in the set of entities.

2. The method of claim 1, wherein the user interface comprises (i) an operation drop down menu than enables the user to specify the operation and (ii) a condition drop down menu that enables the user to specify the condition.

3. The method of claim 1, wherein the condition comprises at least one of (i) a performance measure for the campaign satisfying a threshold performance metric or (ii) a budget for the campaign satisfying a budget threshold.

4. The method of claim 1, wherein at least one entity in the set of entities comprises a budget for the campaign and the operation comprises adjusting the budget of the campaign.

5. The method of claim 1, wherein the operation comprises pausing the campaign.

6. The method of claim 1, wherein the campaign comprises a set of advertisements, the entities comprise bids for the advertisements, and the operation comprises adjusting the bids for the advertisements.

7. The method of claim 1, wherein:
the rule further defines a time period for which data related to the condition is collected and
monitoring the condition defined by the rule comprises monitoring an aggregate value of the collected data to determine whether the condition occurs.

8. A system, comprising:
a data processing apparatus including one or more computers; and
a computer storage system storing instructions that when executed by the data processing apparatus cause the data processing apparatus to perform actions comprising:
providing, for presentation at a client device, a user interface that enables a user to create a rule for a campaign;
receiving, from the client device, data specifying a rule associated with a set of campaign entities of the campaign and that was created using the user interface, wherein the rule defines an operation and a corresponding event, the event being an occurrence of a condition, wherein the operation (i) is executed in response to detecting that the condition has occurred and (ii) specifies a change to a value of each entity in the set of entities;
monitoring the condition defined by the rule;
detecting that the condition has been satisfied; and
in response to detecting that the condition has been satisfied, executing the operation, and in response to the execution, changing the values of the entities in the set of entities.

9. The system of claim 8, wherein the user interface comprises (i) an operation drop down menu than enables the user to specify the operation and (ii) a condition drop down menu that enables the user to specify the condition.

10. The system of claim 8, wherein the condition comprises at least one of (i) a performance measure for the campaign satisfying a threshold performance metric or (ii) a budget for the campaign satisfying a budget threshold.

11. The system of claim 8, wherein at least one entity in the set of entities comprises a budget for the campaign and the operation comprises adjusting the budget of the campaign.

12. The system of claim 8, wherein the operation comprises pausing the campaign.

13. The system of claim 8, wherein the campaign comprises a set of advertisements, the entities comprise bids for the advertisements, and the operation comprises adjusting the bids for the advertisements.

14. The system of claim 8, wherein:
the rule further defines a time period for which data related to the condition is collected and
monitoring the condition defined by the rule comprises monitoring an aggregate value of the collected data to determine whether the condition occurs.

15. A non-transitory computer storage system comprising software, the software comprising instructions that when executed by a data processing apparatus cause the data processing apparatus to perform actions comprising:
providing, for presentation at a client device, a user interface that enables a user to create a rule for a campaign;
receiving, from the client device, data specifying a rule associated with a set of campaign entities of the campaign and that was created using the user interface, wherein the rule defines an operation and a corresponding event, the event being an occurrence of a condition, wherein the operation (i) is executed in response to detecting that the condition has occurred and (ii) specifies a change to a value of each entity in the set of entities;
monitoring the condition defined by the rule;
detecting that the condition has been satisfied; and
in response to detecting that the condition has been satisfied, executing the operation, and in response to the execution, changing the values of the entities in the set of entities.

16. The non-transitory computer storage system of claim 15, wherein the user interface comprises (i) an operation drop down menu than enables the user to specify the operation and (ii) a condition drop down menu that enables the user to specify the condition.

17. The non-transitory computer storage system of claim 15, wherein the condition comprises at least one of (i) a performance measure for the campaign satisfying a threshold performance metric or (ii) a budget for the campaign satisfying a budget threshold.

18. The non-transitory computer storage system of claim 15, wherein at least one entity in the set of entities comprises a budget for the campaign and the operation comprises adjusting the budget of the campaign.

19. The non-transitory computer storage system of claim 15, wherein the operation comprises pausing the campaign.

20. The non-transitory computer storage system of claim 15, wherein the campaign comprises a set of advertisements, the entities comprise bids for the advertisements, and the operation comprises adjusting the bids for the advertisements.

* * * * *